US011356280B2

(12) United States Patent
Wright et al.

(10) Patent No.: US 11,356,280 B2
(45) Date of Patent: Jun. 7, 2022

(54) PERSONAL DEVICE SECURITY USING CRYPTOCURRENCY WALLETS

(71) Applicant: nChain Holdings Limited, St. John's (AG)

(72) Inventors: Craig Steven Wright, London (GB); Stephane Savanah, London (GB)

(73) Assignee: nChain Holdings Ltd, St. John's (AG)

( * ) Notice: Subject to any disclaimer, the term of this patent is extended or adjusted under 35 U.S.C. 154(b) by 144 days.

(21) Appl. No.: 16/926,583

(22) Filed: Jul. 10, 2020

(65) Prior Publication Data

US 2020/0344071 A1    Oct. 29, 2020

Related U.S. Application Data

(63) Continuation of application No. 16/079,082, filed as application No. PCT/IB2017/050815 on Feb. 14, 2017, now Pat. No. 10,715,336.

(30) Foreign Application Priority Data

| Feb. 23, 2016 | (GB) | 1603117 |
| Feb. 23, 2016 | (GB) | 1603122 |
| Nov. 15, 2016 | (GB) | 1619301 |

(51) Int. Cl.
*H04L 9/32* (2006.01)
*H04L 9/08* (2006.01)
(Continued)

(52) U.S. Cl.
CPC .......... *H04L 9/3252* (2013.01); *H04L 9/085* (2013.01); *H04L 9/0825* (2013.01);
(Continued)

(58) Field of Classification Search
CPC ... H04L 9/3252; H04L 9/0825; H04L 9/0841; H04L 9/085; H04L 9/0891; H04L 9/3066;
(Continued)

(56) References Cited

U.S. PATENT DOCUMENTS

| 5,600,725 A | 2/1997 | Rueppel et al. |
| 5,761,305 A | 6/1998 | Vanstone et al. |

(Continued)

FOREIGN PATENT DOCUMENTS

| AU | 2016100059 A4 | 3/2016 |
| CA | 2867765 A1 | 4/2016 |

(Continued)

OTHER PUBLICATIONS

Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.

(Continued)

*Primary Examiner* — Techane Gergiso
(74) *Attorney, Agent, or Firm* — Davis Wright Tremaine LLP

(57) ABSTRACT

A method of encrypting data at an electronic device where the electronic device is associated with a key device. Each device is associated with an asymmetric cryptography pair, each pair including a first private key and a first public key. Respective second private and public keys may be determined based on the first private key, first public key and a deterministic key. A secret may be determined based on the second private and public keys. The data at the electronic device may be encrypted using the determined secret or an encryption key that is based on the secret. Information indicative of the deterministic key may be sent to the key device where the information may be stored.

24 Claims, 6 Drawing Sheets

(51) Int. Cl.
  *H04L 9/30* (2006.01)
  *H04W 12/02* (2009.01)
  *H04W 12/03* (2021.01)
  *H04W 84/18* (2009.01)

(52) U.S. Cl.
  CPC .......... *H04L 9/0841* (2013.01); *H04L 9/0891* (2013.01); *H04L 9/3066* (2013.01); *H04W 12/02* (2013.01); *H04W 12/03* (2021.01); *H04L 2209/56* (2013.01); *H04W 84/18* (2013.01)

(58) Field of Classification Search
  CPC .. H04L 2209/56; H04W 12/03; H04W 12/02; H04W 84/18; G06F 7/725; G07B 2017/00766
  See application file for complete search history.

(56) References Cited

U.S. PATENT DOCUMENTS

| | | |
|---|---|---|
| 5,867,578 A | 2/1999 | Brickell et al. |
| 5,889,865 A | 3/1999 | Vanstone et al. |
| 5,896,455 A | 4/1999 | Vanstone et al. |
| 5,933,504 A | 8/1999 | Vanstone et al. |
| 6,061,449 A | 5/2000 | Candelore et al. |
| 6,078,667 A | 6/2000 | Johnson |
| 6,118,874 A | 9/2000 | Okamoto et al. |
| 6,122,736 A | 9/2000 | Vanstone et al. |
| 6,141,420 A | 10/2000 | Vanstone et al. |
| 6,490,352 B1* | 12/2002 | Schroeppel ........... H04L 9/3066 380/279 |
| 6,618,483 B1 | 9/2003 | Vanstone et al. |
| 6,662,299 B1 | 12/2003 | Price, III |
| 6,704,870 B2 | 3/2004 | Vanstone et al. |
| 6,785,813 B1 | 8/2004 | Vanstone et al. |
| 6,792,530 B1 | 9/2004 | Qu et al. |
| 6,876,745 B1* | 4/2005 | Kurumatani .......... H04L 9/3066 708/250 |
| 7,006,633 B1 | 2/2006 | Reece |
| 7,095,851 B1 | 8/2006 | Scheidt |
| 8,520,855 B1 | 8/2013 | Kohno et al. |
| 8,522,011 B2 | 8/2013 | Spalka et al. |
| 8,855,318 B1 | 10/2014 | Patnala et al. |
| 9,209,980 B2 | 12/2015 | Bowman et al. |
| 9,258,130 B2 | 2/2016 | Hwang et al. |
| 9,298,806 B1 | 3/2016 | Vessenes et al. |
| 9,673,975 B1 | 6/2017 | Machani |
| 10,050,779 B2 | 8/2018 | Alness et al. |
| 10,068,228 B1 | 9/2018 | Winklevoss et al. |
| 10,510,053 B2 | 12/2019 | Armstrong |
| 10,516,527 B1 | 12/2019 | Machani et al. |
| 10,659,223 B2 | 5/2020 | Wright et al. |
| 10,719,816 B1 | 7/2020 | Kurani |
| 11,115,196 B1 | 9/2021 | Triandopoulos et al. |
| 2001/0050990 A1 | 12/2001 | Sudia |
| 2002/0112171 A1 | 8/2002 | Ginter et al. |
| 2002/0198791 A1 | 12/2002 | Perkowski |
| 2003/0026432 A1 | 2/2003 | Woodward |
| 2003/0046202 A1 | 3/2003 | Knapp |
| 2003/0048906 A1 | 3/2003 | Vora et al. |
| 2003/0081785 A1* | 5/2003 | Boneh ................ H04L 9/3073 380/277 |
| 2003/0188153 A1 | 10/2003 | Demoff et al. |
| 2004/0030932 A1 | 2/2004 | Juels et al. |
| 2004/0049687 A1 | 3/2004 | Orsini et al. |
| 2004/0078775 A1 | 4/2004 | Chow et al. |
| 2004/0111484 A1 | 6/2004 | Young et al. |
| 2004/0193890 A1 | 9/2004 | Girault |
| 2005/0071283 A1 | 3/2005 | Randle et al. |
| 2005/0094806 A1* | 5/2005 | Jao ..................... H04L 9/3257 380/30 |
| 2005/0138374 A1 | 6/2005 | Zheng et al. |
| 2006/0023887 A1 | 2/2006 | Agrawal et al. |
| 2006/0153365 A1* | 7/2006 | Beeson ................ H04L 9/3066 380/30 |
| 2006/0153368 A1 | 7/2006 | Beeson |
| 2006/0156013 A1 | 7/2006 | Beeson |
| 2006/0161485 A1 | 7/2006 | Meldahl |
| 2006/0179319 A1 | 8/2006 | Krawczyk |
| 2006/0248114 A1 | 11/2006 | Anderson et al. |
| 2007/0055880 A1 | 3/2007 | Lauter et al. |
| 2007/0165843 A1* | 7/2007 | Lauter ................. H04L 9/3073 380/30 |
| 2007/0192842 A1 | 8/2007 | Beaulieu et al. |
| 2007/0223706 A1 | 9/2007 | Gantman et al. |
| 2007/0265978 A1 | 11/2007 | Kahn et al. |
| 2007/0269040 A1 | 11/2007 | Yuval et al. |
| 2007/0276836 A1 | 11/2007 | Chatterjee et al. |
| 2008/0082817 A1 | 4/2008 | Takahashi et al. |
| 2008/0101596 A1 | 5/2008 | Cerruti et al. |
| 2008/0137857 A1 | 6/2008 | Bellare et al. |
| 2008/0144836 A1 | 6/2008 | Sanders et al. |
| 2008/0285759 A1 | 11/2008 | Shaw |
| 2008/0288773 A1* | 11/2008 | Nguyen ............... H04L 9/3271 713/155 |
| 2009/0022311 A1* | 1/2009 | Vanstone ............. H04L 9/3252 380/28 |
| 2009/0048979 A1 | 2/2009 | Al-Herz et al. |
| 2009/0074179 A1* | 3/2009 | Futa ..................... G06F 7/725 380/28 |
| 2009/0161876 A1 | 6/2009 | Sherkin |
| 2010/0005302 A1 | 1/2010 | Vishnu et al. |
| 2010/0023771 A1 | 1/2010 | Struik |
| 2010/0031369 A1 | 2/2010 | Grummt |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2011/0016510 A1 | 1/2011 | Matsuda et al. |
| 2011/0022854 A1 | 1/2011 | Macchetti et al. |
| 2011/0202773 A1 | 8/2011 | Ghouti et al. |
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0100833 A1 | 4/2012 | Gao |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0177157 A1 | 7/2013 | Li et al. |
| 2013/0191632 A1 | 7/2013 | Spector et al. |
| 2013/0304642 A1 | 11/2013 | Campos |
| 2013/0305057 A1 | 11/2013 | Greco et al. |
| 2014/0012751 A1 | 1/2014 | Kuhn et al. |
| 2014/0068246 A1 | 3/2014 | Hartley et al. |
| 2014/0082358 A1 | 3/2014 | Nakhjiri et al. |
| 2014/0129844 A1 | 5/2014 | Johnson et al. |
| 2014/0223580 A1 | 8/2014 | Neivanov et al. |
| 2014/0250006 A1 | 9/2014 | Makhotin et al. |
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0095648 A1 | 4/2015 | Nix |
| 2015/0120567 A1 | 4/2015 | Van Rooyen et al. |
| 2015/0154562 A1 | 6/2015 | Emmerson |
| 2015/0188698 A1 | 7/2015 | Tsai |
| 2015/0188700 A1 | 7/2015 | Ben Saied et al. |
| 2015/0205929 A1 | 7/2015 | Brama |

(56) References Cited

U.S. PATENT DOCUMENTS

| | | |
|---|---|---|
| 2015/0206106 A1 | 7/2015 | Yago |
| 2015/0213433 A1 | 7/2015 | Khan |
| 2015/0244690 A1 | 8/2015 | Mossbarger |
| 2015/0254463 A1 | 9/2015 | Ryhorchuk et al. |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0294425 A1 | 10/2015 | Benson |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0379510 A1 | 12/2015 | Smith |
| 2015/0381729 A1 | 12/2015 | Manohar et al. |
| 2016/0027229 A1 | 1/2016 | Spanos et al. |
| 2016/0028552 A1 | 1/2016 | Spanos et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | Mcconaghy et al. |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |
| 2016/0342994 A1 | 11/2016 | Davis |
| 2016/0344543 A1 | 11/2016 | Alness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2017/0005804 A1 | 1/2017 | Zinder |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046698 A1 | 2/2017 | Haldenby et al. |
| 2017/0046792 A1 | 2/2017 | Haldenby et al. |
| 2017/0075877 A1 | 3/2017 | Lepeltier |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0103385 A1 | 4/2017 | Wilson, Jr. et al. |
| 2017/0124348 A1 | 5/2017 | Pourzandi et al. |
| 2017/0132621 A1 | 5/2017 | Miller et al. |
| 2017/0148016 A1 | 5/2017 | Davis |
| 2017/0154331 A1 | 6/2017 | Voorhees |
| 2017/0178237 A1 | 6/2017 | Wong |
| 2017/0178263 A1 | 6/2017 | Kraemer et al. |
| 2017/0187535 A1 | 6/2017 | Middleton et al. |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0250801 A1 | 8/2017 | Chen et al. |
| 2017/0300877 A1 | 10/2017 | Mann et al. |
| 2017/0316390 A1 | 11/2017 | Smith et al. |
| 2017/0324715 A1 | 11/2017 | Frincu et al. |
| 2018/0025670 A1 | 1/2018 | Ikarashi et al. |
| 2018/0034810 A1 | 2/2018 | Pe'er et al. |
| 2018/0109377 A1 | 4/2018 | Fu |
| 2018/0123780 A1 | 5/2018 | Ikarashi |
| 2018/0146367 A1 | 5/2018 | Altin et al. |
| 2018/0176017 A1 | 6/2018 | Rodriguez et al. |
| 2018/0176222 A1 | 6/2018 | Bhaskar et al. |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1 | 12/2018 | Wang et al. |
| 2019/0014094 A1 | 1/2019 | Le Saint |
| 2019/0034936 A1 | 1/2019 | Nolan et al. |
| 2019/0080321 A1 | 3/2019 | Mundis et al. |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0340352 A1 | 11/2019 | Peeters et al. |
| 2019/0349733 A1 | 11/2019 | Nolan et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0285935 A1 | 9/2020 | Song et al. |
| 2021/0056070 A1 | 2/2021 | Kakavand et al. |
| 2021/0194677 A1 | 6/2021 | Pourzandi et al. |

FOREIGN PATENT DOCUMENTS

| | | |
|---|---|---|
| CN | 101447980 A | 6/2009 |
| CN | 102144371 A | 8/2011 |
| CN | 103440209 A | 12/2013 |
| CN | 103927656 A | 7/2014 |
| CN | 104320262 A | 1/2015 |
| CN | 105204802 A | 12/2015 |
| DE | 102010002241 B4 | 3/2012 |
| EP | 1477882 A2 | 11/2004 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001195479 A | 7/2001 |
| JP | 2002026895 A | 1/2002 |
| JP | 2006293764 A | 10/2006 |
| JP | 2007242221 A | 9/2007 |
| JP | 2008146601 A | 6/2008 |
| JP | 2009105824 A | 5/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2014068140 A | 4/2014 |
| JP | 2015536617 A | 12/2015 |

(56) References Cited

FOREIGN PATENT DOCUMENTS

| | | |
|---|---|---|
| JP | 5858506 B1 | 2/2016 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012054785 A1 | 4/2012 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |
| WO | 2016022864 A2 | 2/2016 |
| WO | 2016137360 A2 | 9/2016 |
| WO | 2016161073 A1 | 10/2016 |
| WO | 2017112664 A1 | 6/2017 |

OTHER PUBLICATIONS

Akutsu et al., "Taking on the challenge of creating epoch-making services that impress users. For services that can share the excitement of competitions around the world," NTT Technical Journal 27(5):10-14, May 1, 2015.

Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.

Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.

Andersen, "Blockchain Technology: A game-changer in accounting?," Deloitte & Touche GmbH Wirtschaftsprüfungsgesellschaft, Mar. 2016, 5 pages.

Andresen et al., "Relay OP_Return data TxOut as standard transaction type. #2738," Github, Jun. 4, 2013, https://github.com/bitcoin/bitcoin/pull/2738, 12 pages.

Anonymous, "Bitcoin Developer Guide," Bitcoin Project, https://web.archive.org/web/20160515171209/https://bitcoin.org/en/developer-guide. May 15, 2016 [retrieved Mar. 13, 2019], 55 pages.

Anonymous, "Bitsquare—The decentralised bitcoin exchange," Bitsquare.io, Jan. 3, 2016, 14 pages.

Anonymous, "Homepage," website operational as of 2017 [retrieved Nov. 30, 2020], https://www.coinffeine.com/, 2 pages.

Antonopoulos, "Mastering Bitcoin—Unlocking Digital Cryptocurrencies," O'Reilly Media, Inc., Dec. 20, 2014, 282 pages.

Australian Office Action for Application No. 2017223158, dated Jun. 22, 2021, 7 pages.

bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.

bitcoininvestor.com, "All-Star Panel: Ed Moy, Joseph VaughnPerling, Trace Mayer, Nick Szabo, Dr. Craig Wright," YouTube, Nov. 12, 2015, https://www.youtube.com/watch?v=LdvQTwjVmrE, 1 page.

Bitfreak! et al, "Understanding Stealth Addresses/Payments," Bitcoin Forum, Jun. 10, 2015 (retrieved Jun. 16, 2020), https://bitcointalk.org/index.php?topic=1086498.0, 8 pages.

Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.

Block_Chan, "Tweet dated Nov. 7, 2018," Twitter, Nov. 7, 2018, https://twitter.com/block_chan/status/1060336404163584000, 1 page.

Bradbury, "Developers Battle Over Bitcoin Block Chain," Coindesk, http://www.coindesk.com/developers-battle-bitcoin-block-chain/, Mar. 25, 2014, 3 pages.

Brown et al., "Standards for Efficient Cryptography 1: Elliptic Curve Cryptography Version 2.0," Certicom Research, May 21, 2009, 144 pages.

Brown et al., "Standards for Efficient Cryptography 2: Recommended Elliptic Curve Domain Parameters Version 2.0," Certicom Research, Jan. 27, 2010, 37 pages.

Burgess et al., "The Promise of Bitcoin and the Blockchain," Consumers' Research, Jul. 13, 2015, 97 pages.

Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.

Buterin, "Bitcoin Multisig Wallet: The Future of Bitcoin," Bitcoin Magazine, Mar. 13, 2014 [retrieved May 12, 2020], https://bitcoinmagazine.com/articles/multisig-future-bitcoin-1394686504, 7 pages.

Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.

Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.

Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.

Christidis et al., "Blockchains and Smart Contracts for the Internet of Things," IEEE Access 4(1):2292-2303, May 10, 2016.

Coinprism, "80 bytes OP_Return explained," Coinprism Blog, http://blog.coinprism.com/2015/02/11/80-bytes-op-return/, Feb. 11, 2015 [retrieved Dec. 21, 2018], 8 pages.

Corallo, "[Bitcoin-development] Relative Checklocktimeverify (was CLTV proposal)," Linux Foundation, https://lists.linuxfoundation.org/pipermail/bitcoin-dev/2015-May/007858.html, May 4, 2015 [retrieved Dec. 12, 2018], 3 pages.

Counterparty, "Home Page," Counterparty, copyright 2018 [retrieved Jan. 13, 2020], counterparty.io, 3 pages.

Danda et al., "hd-wallet-addrs," GitHub, https://github.com/dan-da/hd-wallet-addrs, Dec. 30, 2015 [retrieved Mar. 11, 2016], 7 pages.

Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.

Danda, "Help / FAQ," MyBitPrices, https://mybitprices.info/hd-wallet-addrs.html, Jan. 1, 2016 [retrieved Mar. 11, 2016], 4 pages.

Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.

Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.

Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.

Dixon, "True peer-to-peer currency exchange?," DGC Magazine, Jul. 2, 2013 [retrieved May 12, 2020], http://dgcmagazine.com/true-peer-to-peer-currency-exchange/, 6 pages.

Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.

Drcode,"New Kid on the Blockchain," Hacker News, https://news.ycombinator.com/item?id=11372455, Mar. 28, 2016 [Dec. 12, 2018], 32 pages.

Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.

Eragmus et al., "Time to lobby Bitcoin's core devs: "SF Bitcoin Devs Seminar—Scalability to billions of transactions per day, satoshi-level Micropayments, near-zero risk of custodial theft, & Instant transactions"... but only w/ a malleability-fixing soft fork,"

(56) References Cited

OTHER PUBLICATIONS

Reddit r/bitcoin, https://www.reddit.com/r/Bitcoin/comments/2z2I91/time_to_lobby_bitcoins_core_devs_sf_bitcoin_devs/, Mar. 14, 2015 [Dec. 12, 2018], 21 pages.
European Communication pursuant to Article 94(3) EPC dated Jan. 2, 2020, Patent Application No. 18166910.2-1218, filed Feb. 16, 2017, 4 pages.
European Communication pursuant to Article 94(3) EPC dated Jul. 1, 2019, Application No. 17707121.4-1218, filed Feb. 14, 2017, 6 pages.
Extended European Search Report dated Jul. 18, 2018, Patent Application No. 18166910.2-1218, filed Feb. 16, 2017, 8 pages.
Familiar et al., "Transcript for #bitcoin-dev Mar. 27, 2015," BitcoinStats, http://bitcoinstats.com/irc/bitcoin-dev/logs/2015/03/27, Mar. 27, 2015 [archived version Jun. 27, 2016], 11 pages.
Fimkrypto, "FIMK 0.6.4 Released," Github.com, Feb. 11, 2016 [retrieved Jan. 30, 2017], https://github.com/fimkrypto/fimk/releases, 17 pages.
Flood et al., "Contract as Automaton: The Computational Representation of Financial Agreements," Office of Financial Research Working Paper No. 15-04, Mar. 26, 2015, 25 pages.
Fotiou et al., "Decentralized Name-based Security for Content Distribution using Blockchains," retrieved from, Mobile Multimedia Laboratory, Department of Informatics, Apr. 14, 2016, 6 pages.
Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.
Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.
Fuchita, "Special Topic: Innovation and Finance, Blockchain and Financial Transaction Innovation," Nomura Capital Market Quarterly 19-2(74):11-35, Nov. 1, 2015.
UK Commercial Search Report dated May 24, 2016, Patent Application No. GB1605571.7, filed Apr. 1, 2016, 3 pages.
UK Commercial Search Report dated May 9, 2016, Patent Application No. GB1603114.8, filed Feb. 23, 2016, 2 pages.
UK Commercial Search Report dated Nov. 14, 2016, Patent Application No. GB1607063.3, 8 pages.
UK Commercial Search Report dated Nov. 30, 2016, Patent Application No. 1607058.3, filed Apr. 22, 2016, 7 pages.
UK Commercial Search Report dated Oct. 10, 2016, Patent Application No. GB1607484.1, filed Apr. 29, 2016, 5 pages.
UK Commercial Search Report dated Sep. 30, 2016, Patent Application No. 1606630.0, filed Apr. 15, 2016, 7 pages.
UK Expanded Commercial Search Report dated Jun. 15, 2016, Patent Application No. 1605026.2, 5 pages.
UK IPO Search Report dated Dec. 12, 2016, Patent Application No. GB1606630.0, filed Apr. 15, 2016, 4 pages.
UK IPO Search Report dated Dec. 15, 2016, Patent Application No. GB1607063.3, 6 pages.
UK IPO Search Report dated Dec. 21, 2016, Patent Application No. GB1607058.3, filed Apr. 22, 2016, 3 pages.
UK IPO Search Report dated Dec. 28, 2016, Patent Application No. GB1604497.6, filed Mar. 16, 2016, 4 pages.
UK IPO Search Report dated Dec. 5, 2016, Patent Application No. 1607249.8, 4 pages.
UK IPO Search Report dated Dec. 6, 2016, Patent Application No. 1604493.5, 6 pages.
UK IPO Search Report dated Dec. 6, 2016, Patent Application No. 1607482.5, 5 pages.
UK IPO Search Report dated Jan. 25, 2017, Patent Application No. 1605026.2, 3 pages.
UK IPO Search Report dated Jan. 3, 2017, Patent Application No. 1604498.4, 4 pages.
UK IPO Search Report dated Jul. 26, 2016, Patent Application No. GB1603114.8, filed Feb. 23, 2016, 5 pages.
UK IPO Search Report dated Jul. 4, 2016, Patent Application No. GB1603125.4, 6 pages.
UK IPO Search Report dated Jul. 4, 2016, Patent Application No. GB1603125.4, filed Feb. 23, 2016, 6 pages.
UK IPO Search Report dated Jul. 5, 2016, Patent Application No. GB1603123.9, filed Feb. 23, 2016, 5 pages.
UK IPO Search Report dated Oct. 17, 2016, Patent Application No. GB1603117.1, filed Feb. 23, 2016, 5 pages.
UK IPO Search Report dated Oct. 26, 2016, Patent Application No. GB1603122.1, filed Feb. 23, 2016, 4 pages.
UK IPO Search Report dated Sep. 9, 2016, Patent Application No. GB1605571.7, filed Apr. 1, 2016, 5 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Vayngrib, "Future, operating business on chain," Github.com, May 4, 2015 [retrieved Jan. 30, 2017], https://github.com/tradle/about/wiki/Future,-operating-business-on-chain, 9 pages.
Vietnamese Office Action dated Sep. 27, 2018, Patent Application No. 1-2018-03358, filed Feb. 16, 2017, 2 pages.
Walport et al., "Distributed Ledger Technology: beyond block chain—A report by the UK Government Chief Scientific Adviser," United Kingdom Government Office for Science, Dec. 2015, 88 pages.
Watanabe et al., "Blockchain contract: A complete consensus using blockchain," IEEE 4th Global Conference on Consumer Electronics, Oct. 27, 2015, 3 pages.
Weller et al., "CounterpartyXCP/Documentation: Protocol Specification," Github.com, Jan. 25, 2015 (last edited Jun. 17, 2019) [retrieved Jan. 13, 2020], https://github.com/CounterpartyXCP/Documentation/blob/master/Developers/protocol_specification.md, 10 pages.
White, "How Computers Work," Que Publishing 7th Edition, Oct. 15, 2003, 44 pages.
Whitequark, "#bitcoin-wizards on Jul. 30, 2015—irc logs at whitequark.org," whitequark.org, https://irclog.whitequark.org/bitcoin-wizards/Jul. 30, 2015, Jul. 30, 2015 [retrieved Dec. 12, 2018], 8 pages.
Wikipedia, "Counterparty (platform)," Wikipedia, the Free Encyclopedia, last edited Dec. 6, 2019 [retrieved Jan. 13, 2020], https://en.wikipedia.org/wiki/Counterparty_(platform), 2 pages.
Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.
Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.
Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.
Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.
Wright, "Registry and Automated Management Method for Blockchain Enforced Smart Contracts," U.S. Appl. No. 15/138,717, filed Apr. 26, 2016.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.
Yaokai et al., "Experimental evaluation of the next-generation cryptocurrency platform Ethereum," CSS2015 Computer Security Symposium 2015 Proceedings 2015(3):1151-1158, Oct. 14, 2015.
Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.

(56) References Cited

OTHER PUBLICATIONS

Zyskind et al., "Decentralizing Privacy: Using a Blockchain to Protect Personal Data," 2015 IEEE CS Security and Privacy Workshops, May 21, 2015, 5 pages.
Zyskind et al., "Enigma: Decentralized Computation Platform with Guaranteed Privacy," Jun. 10, 2015, 14 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Minsky et al., "Computation: Finite and Infinite Machines Chapter 14: Very Simple Bases for Computability," Prentice Hall, Inc, 1967, 29 pages.
Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.
Nakamoto, "Bitcoin: A Peer-to-Peer Electronic Cash System," Bitcoin, Oct. 31, 2008, https://bitcoin.org/bitcoin.pdf, 9 pages.
Noizat, "Handbook of Digital Currency Chapter 22: Blockchain Electronic Vote," Elsevier Inc., David Lee Kuo Chuen (ed.), May 2015, 9 pages.
Openchain, "Home Page," openchain.org, Dec. 22, 2015 [retrieved May 8, 2020], https://web.archive.org/web/20151222083734/https://www.openchain.org/, 18 pages.
OPENSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
OPENSSL Wiki, "EVP Key Agreement," OpenSSL, https://wiki.openssl.org/index.php/EVP_Key_Agreement, Apr. 28, 2017 [retrieved Dec. 10, 2018], 2 pages.
Perry, "Tapeke: Bitcoin Accounting for Non-Accountants," http://codinginmysleep.com/tapeke-bitcoin-accounting-for-non-accountants/, Jan. 21, 2015, 1 page.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.
Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.
Reiner et al., "Bitcoin Wallet Identity Verification Specification," diyhpluswiki, http://diyhpl.us/-bryan/papers2/bitcoin/armory-verisign-bitcoin-wallet-identityspecification.pdf, Feb. 27, 2015 (retrieved Jan. 27, 2016), 24 pages.
Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.
Sams, "Ethereum: Turing-complete, programmable money," Cryptonomics, Feb. 1, 2014, https://cryptonomics.org/2014/02/01/ethereum-turing-complete-programmable-money, 4 pages.
Sanchez,"Marketplaces," GitHub, Jun. 10, 2015 [retrieved May 12, 2020], https://github.com/drwasho/openbazaar-documentation/blob/master/04%20Marketplaces.md, 37 pages.
Sanchez, "Protocol," Github, https://github.com/drwasho/openbazaar-documentation/blob/master/03%20Protocol.md, Jun. 15, 2015, 53 pages.

Sanchez, "Ricardian Contracts in OpenBazaar," Github, https://gist.github.com/drwasho/a5380544c170bdbbbad8, Jan. 2016, 12 pages.
Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.
Satoshi et al., "Connection Limits," Bitcoin Forum, Aug. 9, 2010, https://bitcointalk.org/index.php?topic=741.0;prev_next=prev, 2 pages.
Sott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Snow et al., "Factom: Business Processes Secured by Immutable Audit Trails on the Blockchain Version 1.2," factom.com, Apr. 25, 2018, 38 pages.
Stampery, "Features: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Swan, "Blockchain: Blueprint for a New Economy," O'Reilly, Feb. 2015, 149 pages.
Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.
Taiwanese Office Action dated Apr. 12, 2021, Patent Application No. 109142412, 5 pages.
Taiwanese Office Action dated Jul. 28, 2020, Patent Application No. 106105709, 9 pages.
Taiwanese Office Action dated Oct. 7, 2020, Patent Application No. 106105713, 4 pages.
Tasca et al., "Digital Currencies: Principles, Trends, Opportunities, and Risks," ECUREX Research Working Paper, Sep. 7, 2015 (Oct. 2015 version), 110 pages.
Third-Party Submission Under 37 CFR 1.290 dated Jun. 12, 2019, U.S. Appl. No. 16/078,605, filed Aug. 21, 2018, 31 pages.
Third-Party Submission Under 37 CFR 1.290 dated Jun. 12, 2019, U.S. Appl. No. 16/079,089, filed Aug. 22, 2018, 19 pages.
TIMEISNOW77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
Tuesta et al., "Smart contracts: the ultimate automation of trust?," BBVA Research Financial Inclusion Unit, Oct. 2015, 5 pages.
UK Commercial Search Report dated Apr. 25, 2016, Patent Application No. 11603117.1, filed Feb. 23, 2016, 11 pages.
UK Commercial Search Report dated Feb. 17, 2017, Patent Application No. 1604493.5, 8 pages.
UK Commercial Search Report dated Jan. 13, 2017, Patent Application No. 1604498.4, 8 pages.
UK Commercial Search Report dated Jun. 14, 2016, Patent Application No. 1607249.8, 4 pages.
UK Commercial Search Report dated Jun. 27, 2016, Patent Application No. GB1603123.9, filed Feb. 23, 2016, 11 pages.
UK Commercial Search Report dated Jun. 27, 2016, Patent Application No. GB 1603125.4, 11 pages.
UK Commercial Search Report dated Jun. 27, 2016, Patent Application No. GB1603125.4, filed Feb. 23, 2016, 11 pages.
UK Commercial Search Report dated Jun. 28, 2016, Patent Application No. GB 1603122.1, filed Feb. 23, 2016, 12 pages.
UK Commercial Search Report dated Jun. 6, 2016, Patent Application No. 1604497.6, filed Mar. 16, 2016, 6 pages.

(56) References Cited

OTHER PUBLICATIONS

UK Commercial Search Report dated Jun. 9, 2016, Patent Application No. GB1603117.1, filed Feb. 23, 2016, 12 pages.
UK Commercial Search Report dated May 16, 2016, Patent Application No. GB1603125.4, 8 pages.
UK Commercial Search Report dated May 20, 2016, Patent Application No. 1605026.2, 4 pages.
Fujimura et al., "Bright: A Concept for a Decentralized Rights Management System Based on Blockchain," 2015 IEEE 5th International Conference on Consumer Electronics-Berlin (ICCE-Berlin), Sep. 6, 2015, 2 pages.
Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gitbook, "Ethereum Frontier Guide," Gitbook (Legacy), Feb. 4, 2016, 293 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Goldfeder et al., "Securing Bitcoin wallets via threshold signatures" Princeton's Center for Information Technology Policy, Mar. 28, 2014, 11 pages.
Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.
Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute of Electronics, Information and Communication Engineers (IEICE) Technical Report 109(85):91-96, Jun. 11, 2009.
Hearn, "Distributed markets," Bitcoin Wiki, https://en.bitcoin.it/wiki/Distributed_markets, Jul. 11, 2015 [retrieved Sep. 20, 2016], 5 pages.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
International Search Report and Written Opinion dated Apr. 10, 2017, Patent Application No. PCT/IB2017/050861, 11 pages.
International Search Report and Written Opinion dated Apr. 12, 2017, Patent Application No. PCT/IB2017/050829, 9 pages.
International Search Report and Written Opinion dated Apr. 12, 2017, Patent Application No. PCT/IB2017/050866, 10 pages.
International Search Report and Written Opinion dated Apr. 26, 2017, International Patent Application No. PCT/IB2017/050865, filed Feb. 16, 2017, 9 pages.
International Search Report and Written Opinion dated Apr. 3, 2017, Patent Application No. PCT/IB2017/050824, filed Feb. 14, 2017, 13 pages.
International Search Report and Written Opinion dated Apr. 3, 2017, Patent Application No. PCT/IB2017/050827, 10 pages.
International Search Report and Written Opinion dated Mar. 29, 2017, Patent Application No. PCT/IB2017/050821, 10 pages.
International Search Report and Written Opinion dated Mar. 30, 2017, Patent Application No. PCT/IB2017/050819, 13 pages.
International Search Report and Written Opinion dated Mar. 30, 2017, Patent Application No. PCT/IB2017/050825, 9 pages.
International Search Report and Written Opinion dated May 29, 2017, International Patent Application No. PCT/IB2017/050815, filed Feb. 14, 2017, 10 pages.
International Search Report and Written Opinion dated May 31, 2017, Patent Application No. PCT/IB2017/050856, filed Feb. 16, 2017, 11 pages.
International Search Report and Written Opinion dated May 31, 2017, Patent Application No. PCT/IB2017/050867, 11 pages.
International Search Report and Written Opinion dated May 31, 2017, Patent Application No. PCT/IB2017/050979, filed Feb. 21, 2017, 11 pages.
International Search Report and Written Opinion dated May 31, 2017, Patent Application No. PCT/IB2017/050980, 12 pages.
Japanese Notice of Reason(s) for Rejection dated Mar. 30, 2021, Patent Application No. 2018-539890, 8 pages.
Japanese Notice of Reason(s) for Rejection dated Mar. 30, 2021, Patent Application No. 2018-539893, 6 pages.
Japanese Office Action dated Feb. 16, 2021, Patent Application No. 2018-539331, 7 pages.
Japanese Office Action dated Jan. 22, 2019, Patent Application No. 2018-516682, filed Feb. 16, 2017, 14 pages.
Japanese Office Action dated Oct. 6, 2020, Patent Application No. 2018-539865, 14 pages.
Japanese Office Action dated Oct. 8, 2019, Patent Application No. 2018-539895, 9 pages.
Jesionek et al., "BIP0032: Hierarchical Deterministic Wallets," GitHub, https://github.com/bitcoin/bips/blob/master/bip-0032 mediawiki, Jan. 2014, 9 pages.
Il2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.
Kens et al., "Cryptocontracts Will Turn Contract Law Into a Programming Language ," Hacker News, Feb. 23, 2014, https://news.ycombinator.com/item?id=7287155, 12 pages.
Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography, 78(1):87-102, publication available online Oct. 1, 2015, print publication Jan. 2016.
Kosba et al., "Hawk: The Blockchain Model of Cryptography and Privacy-Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Lebeau, "An Ethereum Journey to Decentralize All Things," retrieved from https://medium.com/@SingularDTV/an-ethereum-journey-to-decentralize-all-things- 8d62b02e232b#.r6n9w8kqh, Jul. 11, 2016, 10 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.
McCorry et al., "Authenticated Key Exchange over Bitcoin," International Conference on Research in Security Standardisation 2015, Dec. 15, 2015, 18 pages.
Menezes et al., "Handbook of Applied Cryptography: pp. 33, 38," CRC Press, Oct. 16, 1996, 3 pages.

(56) References Cited

OTHER PUBLICATIONS

Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.

Michalko et al., "Decent Whitepaper," retrieved from http://forklog.net/decent-finalizes-its-decentralized-content-distribution-platform/, Nov. 2015, 20 pages.

Michalko, "Decent Finalizes its Decentralized Content Distribution Platform," retrieved from http://forklog.net/decent-finalizes-its-decentralized-content-distribution-platform/, Dec. 14, 2016, 2 pages.

* cited by examiner

PERSONAL DEVICE SECURITY USING CRYPTOCURRENCY WALLETS

CROSS-REFERENCE TO RELATED APPLICATIONS

This application is a continuation of U.S. application Ser. No. 16/079,082 filed Aug. 21, 2018, entitled "PERSONAL DEVICE SECURITY USING ELLIPTIC CURVE CRYPTOGRAPHY FOR SECRET SHARING," a national stage entry based on PCT/IB2017/050815 filed Feb. 14, 2017, entitled "PERSONAL DEVICE SECURITY USING ELLIPTIC CURVE CRYPTOGRAPHY FOR SECRET SHARING," which claims priority to and incorporates by reference for all purposes the full disclosures of United Kingdom Application No. GB1619301.3 filed Nov. 15, 2016, entitled "Determining a common secret for two blockchain nodes for the secure exchange of information." United Kingdom Application No. GB1603122.1 filed Feb. 23, 2016, entitled "Personal device security using cryptocurrency wallets," and United Kingdom Application No. GB1603117.1 filed Feb. 23, 2016, entitled "Determining a common secret for two blockchain nodes for the secure exchange of information."

TECHNICAL FIELD

The present disclosure relates to a method, a system and a device for encrypting data stored on an electronic device. The present disclosure further relates to a method, a system and a device for decrypting the encrypted data.

BACKGROUND

Cryptography involves techniques for protecting data on a hard disk of an electronic device, for example in the event that the electronic device is lost or stolen. An electronic device may include a laptop computer, a desktop computer, a tablet computer, a mobile communication device and any other form of computing device. The electronic device may be associated with a natural person, a group of people such as employees of a company, a system such as a banking system, etc.

In some cases, the data on a hard disk of the electronic device may be protected by a password, passphrase or a PIN. However, short codes such as 4-8 character PINs can easily be determined by trialling different combinations of characters. Passwords and passphrases may be more secure than PINs. However, the level of security depends on the user memorising a lengthy set of code words or a sentence.

In other cases, a cryptographic key may be used to protect the data on the hard disk of the electronic device. The cryptographic key may be stored on a USB drive which needs to be physically connected to the electronic device to transmit the cryptographic key. However, due to electromagnetic signals that are generated during the transmission of the cryptographic key from the USB drive to the electronic device, the transmitted key may still be obtained by a third party.

Therefore a problem in such cryptographic data protection is the transmission of the secret key to the electronic device.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A computer implemented method of encrypting data at an electronic device (S), the electronic device being associated with a key device (C), wherein the electronic device is further associated with a first asymmetric cryptography pair having a first electronic device private key ($V_{1S}$) and a first electronic device public key ($P_{1S}$), and the key device is associated with a second asymmetric cryptography pair having a first key device private key ($V_{1C}$) and a first key device public key ($P_{1C}$); the method comprising:

determining, at the electronic device, a deterministic key (DK);

receiving, at the electronic device, the first key device public key ($P_{1C}$) from the key device;

determining, at the electronic device, a second electronic device private key ($V_{2S}$) based on at least the first electronic device private key ($V_{1S}$) and the deterministic key (DK), and determining, at the electronic device, a second key device public key ($P_{2C}$) based on at least the first key device public key ($P_{1C}$) and the deterministic key (DK);

determining a secret based on at least the second electronic device private key ($V_{2S}$) and the second key device public key ($P_{2C}$);

encrypting the data at the electronic device using the determined secret or an encryption key that is based on the determined secret; and sending information indicative of the deterministic key (DK) to the key device where the information can be stored.

The method may further comprise storing, at the key device, the information indicative of the deterministic key (DK).

The deterministic key (DK) may be based on a message (M). The method may comprise a step of generating the message (M) at the electronic device. The method may further comprise determining the deterministic key (DK) based on determining a hash of the message (M). The step of storing information indicative of the deterministic key on the key device may comprise storing the message (M) on the key device.

The method may comprise determining a second electronic device public key ($P_{2S}$) based on at least the first electronic device public key ($P_{1S}$) and the deterministic key (DK).

The method may also comprise: sending from the electronic device to the key device, a notice indicative of using a common elliptic curve cryptography (ECC) system with a common generator (G).

The first electronic device public key ($P_{1S}$) and the first key device public key ($P_{1C}$) may be based on elliptic curve point multiplication of the respective first electronic device private key ($V_{1S}$) and first key device private key ($V_{1C}$) and the common generator (G).

The method may comprise generating the first electronic device private key ($V_{1S}$) and the first electronic device public key ($P_{1S}$). For example, the first electronic device private key ($V_{1S}$) may be generated based on a random integer in an allowable range specified in the common ECC system; and the first electronic device public key ($P_{1S}$) may be generated based on elliptic curve point multiplication of the first electronic device private key ($V_{1C}$) and the common generator (G) according to the following formula:

$$P_{1S} = V_{1S} \times G$$

The second electronic device private key ($V_{2S}$) may be based on a scalar addition of the first electronic device private key ($V_{1S}$) and the deterministic key (DK) according to the following formula:

$$V_{2S} = V_{1S} + DK$$

The second electronic device public key ($P_{2S}$) may be based on at least the first electronic device public key ($P_{1S}$) with elliptic curve point addition to the deterministic key (DK). In a specific example, the second electronic device public key ($P_{2S}$) may be based on the first electronic device public key ($P_{1S}$) with elliptic curve point addition to the elliptic curve point multiplication of the deterministic key (DK) and the common generator (G) according to the following formula:

$$P_{2S} = P_{1S} + DK \times G.$$

The second key device public key ($P_{2C}$) may be based on at least the first key device public key ($P_{1C}$) with elliptic curve point addition to the deterministic key (DK). In a specific example, the second key device public key ($P_{2C}$) may be based on the first key device public key ($P_{1C}$) with elliptic curve point addition to the elliptic curve point multiplication of the deterministic key (DK) and the common generator (G) according to the following formula:

$$P_{2C} = P_{1C} + DK \times G$$

The method may comprise determining the encryption key based on the determined secret. For example, the encryption key may be based on the secret and identification information of the electronic device. The identification information may comprise a serial number of the electronic device.

The method may comprise connecting the electronic device with the key device to be in communication with each other. For example, the electronic device may be connected to the key device via a wireless protocol, such as Bluetooth or a communications network, for example the internet, or a local communications network. Alternatively, the electronic device may be connected to the key device by virtue of a wire, for example via cable or a suitable port of the electronic device.

The method may further comprise storing, at a data storage associated with the electronic device, the first key device public key ($P_{1C}$).

A computer implemented method of decrypting data at an electronic device, the data being encrypted in accordance with the method of encrypting data as described above, the method of decrypted the data comprising:
receiving, at the electronic device, the information indicative of the deterministic key (DK), from the key device;
determining the secret based on the received information indicative of the deterministic key (DK); and
decrypting, at the electronic device, the encrypted data using the secret or the encryption key that is based on the secret.

The method may comprise authenticating the key device. For this, the method may comprise generating, at the electronic device, an authentication message ($M_A$) and sending the authentication message ($M_A$) to the key device.

The method may comprise generating, at the key device, a second asymmetric cryptography pair having a second key device private key ($V_{2C}$) and a second key device public key ($P_{2C}$). The second key device private key ($V_{2C}$) may be based on a deterministic authentication key ($DK_A$) and the first key device private key ($V_{1C}$). The second key device public key ($P_{2C}$) may be based on the deterministic authentication key ($DK_A$) and the first key device public key ($P_{1C}$).

The method may comprise determining the deterministic authentication key ($DK_A$). For example, the deterministic authentication key ($DK_A$) may be determined based on the authentication message ($M_A$), such as by determining a hash of the message ($M_A$).

The method may include generating, at the key device, a signed authentication message ($SM_A$) based on the deterministic authentication key ($DK_A$) and the second key device private key ($V_{2C}$).

The method may further include: receiving, at the electronic device, the signed authentication message ($SM_A$) from the key device; validating the signed message ($SM_A$) with the second key device public key ($P_{2C}$); and authenticating the key device based on the result of validating the signed authentication message ($SM_A$).

The method of decrypting the data may comprise requesting, at the electronic device, the information indicative of the deterministic key (DK) from the key device. In embodiments in which the information indicative of the deterministic key (DK) comprises the message (M), in response to receiving the request at the key device, the key device may generate a signed message (SM) based on the message (M) and send the signed message (SM) to the electronic device. The signed message (SM) may be generated based on the message (M) and the first or second key device private key.

The method of decrypting the data may further comprise validating, at the electronic device, the signed message (SM) and retrieving the message (M) such that the secret can be determined, at the electronic device, for decrypting the data.

A computer system for encrypting data at an electronic device, the computer system comprising:
the electronic device being associated with a first asymmetric cryptography pair having a first electronic device private key ($V_{1S}$) and a first electronic device public key ($P_{1S}$),
a key device being associated with a second asymmetric cryptography pair having a first key device private key ($V_{1C}$) and a first key device public key ($P_{1C}$);
wherein the electronic device comprises a processor configured to:
determine a deterministic key (DK);
receive the first key device public key ($P_{1C}$) from the key device;
determine a second electronic device private key ($V_{2S}$) based on at least the first electronic device private key ($V_{1S}$) and the deterministic key (DK), and
determine a second key device public key ($P_{2C}$) based on at least the first key device public key ($P_{1C}$) and the deterministic key (DK);
determine a secret based on at least the second electronic device private key ($V_{2S}$) and the second key device public key ($P_{2C}$); and
encrypt the data on the electronic device using the determined secret or an encryption key that is based on the determined secret;
wherein information indicative of the deterministic key (DK) is stored on the key device.

The deterministic key (DK) may be based on a message (M). The processor may be configured to generate the message (M). The processor may further be configured to determine the deterministic key (DK) based on determining a hash of the message (M).

The processor may be configured to determine a second electronic device public key ($P_{2S}$) based on at least the first electronic device public key ($P_{1S}$) and the deterministic key (DK).

In the system, the electronic device may comprise an interface and the key device may comprise a key device interface to establish communication between the electronic device and the key device. For example, the electronic device may be connected to the key device via a wireless protocol, such as Bluetooth or a communications network, for example the internet, or a local communications network. Alternatively, the electronic device may be connected to the key device by virtue of a wire, for example via cable or a suitable port of the electronic device.

The interface of the electronic device may be configured to send a notice indicative of using a common elliptic curve cryptography (ECC) system with a common generator (G) to the key device interface of the associated key device.

The first electronic device public key ($P_{1S}$) and the first key device public key ($P_{1C}$) may be based on elliptic curve point multiplication of respective first electronic device private key ($V_{1S}$) and first key device private key ($V_{1C}$) and a generator (G).

The processor may be configured to generate the first electronic device private key ($V_{1S}$) and the first electronic device public key ($P_{1S}$). For example, the first electronic device private key ($V_{1S}$) may be generated based on a random integer in an allowable range specified in the common ECC system; and the first electronic device public key ($P_{1S}$) may be generated based on elliptic curve point multiplication of the first electronic device private key ($V_{1C}$) and the common generator (G) according to the following formula:

$$P_{1S} = V_{1S} \times G$$

The second electronic device private key ($V_{2S}$) may be based on a scalar addition of the first electronic device private key ($V_{1S}$) and the deterministic key (DK) according to the following formula:

$$V_{2S} = V_{1S} + DK$$

The second electronic device public key ($P_{2S}$) may be based on at least the first electronic device public key ($P_{1S}$) with elliptic curve point addition to the deterministic key (DK). In a specific example, the second electronic device public key ($P_{2S}$) may be based on the first electronic device public key ($P_{1S}$) with elliptic curve point addition to the elliptic curve point multiplication of the deterministic key (DK) and the common generator (G) according to the following formula:

$$P_{2S} = P_{1S} + DK \times G.$$

The second key device public key ($P_{2C}$) may be based on at least the first key device public key ($P_{1C}$) with elliptic curve point addition to the deterministic key (DK). In a specific example, the second key device public key ($P_{2C}$) may be based on the first key device public key ($P_{1C}$) with elliptic curve point addition to the elliptic curve point multiplication of the deterministic key (DK) and the common generator (G) according to the following formula:

$$P_{1C} = P_{1C} + DK \times G$$

The processor may be configured to determine the encryption key based on the determined secret. For example, the encryption key may be based on the determined secret and identification information of the electronic device. The identification information may comprise a serial number of the electronic device.

The electronic device may comprise a data storage in which the first key device public key ($P_{1C}$) may be stored.

The key device may comprise a key device data storage for storing at least the information indicative of the deterministic key.

The computer system as described above further configured to decrypt data, the processor of the electronic device being configured to:

receive the information indicative of the deterministic key (DK), from the key device;

determine the secret based on the information indicative of the deterministic key (DK); and decrypt the data using the determined secret or the encryption key that is based on the determined secret.

The processor may be configured to authenticate the key device. For this, the processor may generate an authentication message ($M_A$) and send the authentication message ($M_A$) to the key device.

The key device may comprise a key device processor that may be configured to generate a second asymmetric cryptography pair having a second key device private key ($V_{2C}$) and a second key device public key ($P_{2C}$). The second key device private key ($V_{2C}$) may be based on a deterministic authentication key ($DK_A$) and the first key device private key ($V_{1C}$). The second key device public key ($P_{2C}$) may be based on the deterministic authentication key ($DK_A$) and the first key device public key ($P_{1C}$).

The key device processor may further be configured to determine the deterministic authentication key ($DK_A$). For example, the deterministic authentication key ($DK_A$) may be determined based on the authentication message ($M_A$), such as by determining a hash of the message ($M_A$).

The key device processor may be configured to generate a signed authentication message ($SM_A$) based on the deterministic authentication key ($DK_A$) and the second key device private key ($V_{2C}$).

The processor of the electronic device may be configured to: receive the signed authentication message ($SM_A$) from the key device; validate the signed message ($SM_A$) with the second key device public key ($P_{2C}$); and authenticate the key device based on the result of validating the signed authentication message ($SM_A$).

The processor of the electronic device may request the information indicative of the deterministic key (DK) from the key device. In embodiments in which the information indicative of the deterministic key (DK) comprises the message (M), in response to receiving the request at the key device, the key device processor may generate a signed message (SM) based on the message (M) and send the signed message (SM) to the electronic device. The signed message (SM) may be generated based on the message (M) and the first or second key device private key.

The processor of the electronic device may further be configured to validate the signed message and retrieving the message (M) such that the secret can be determined for decrypting the data.

An electronic device for encrypting data, the electronic device being associated with a key device, wherein the electronic device is associated with a first asymmetric cryptography pair having a first electronic device private key ($V_{1S}$) and a first electronic device public key ($P_{1S}$), and the key device is associated with a second asymmetric cryptography pair having a first key device private key ($V_{1C}$) and a first key device public key ($P_{1C}$); the electronic device comprising a processing device configured to:
- determine a deterministic key (DK);
- receive the first key device public key ($P_{1C}$) from the associated key device;
- determine a second electronic device private key ($V_{2S}$) based on at least the first electronic device private key ($V_{1S}$) and the deterministic key (DK), and
- determine a second key device public key ($P_{2C}$) based on at least the first key device public key ($P_{1C}$) and the deterministic key (DK);
- determine a secret based on at least the second electronic device private key ($V_{2S}$) and the second key device public key ($P_{2C}$); and
- encrypt the data on the electronic device using the determined secret or an encryption key that is based on the determined secret;
- wherein information indicative of the deterministic key (DK) is sent to the key device where it can be stored.

A computer program comprising machine-readable instructions to cause a processing device of an electronic device to implement any one of the methods described above.

BRIEF DESCRIPTION OF DRAWINGS

Examples of the present disclosure will be described with reference to the following figures.

DESCRIPTION OF EMBODIMENTS

Overview

A method, device and system to encrypt data at an electronic device will now be described.

Figure 1:
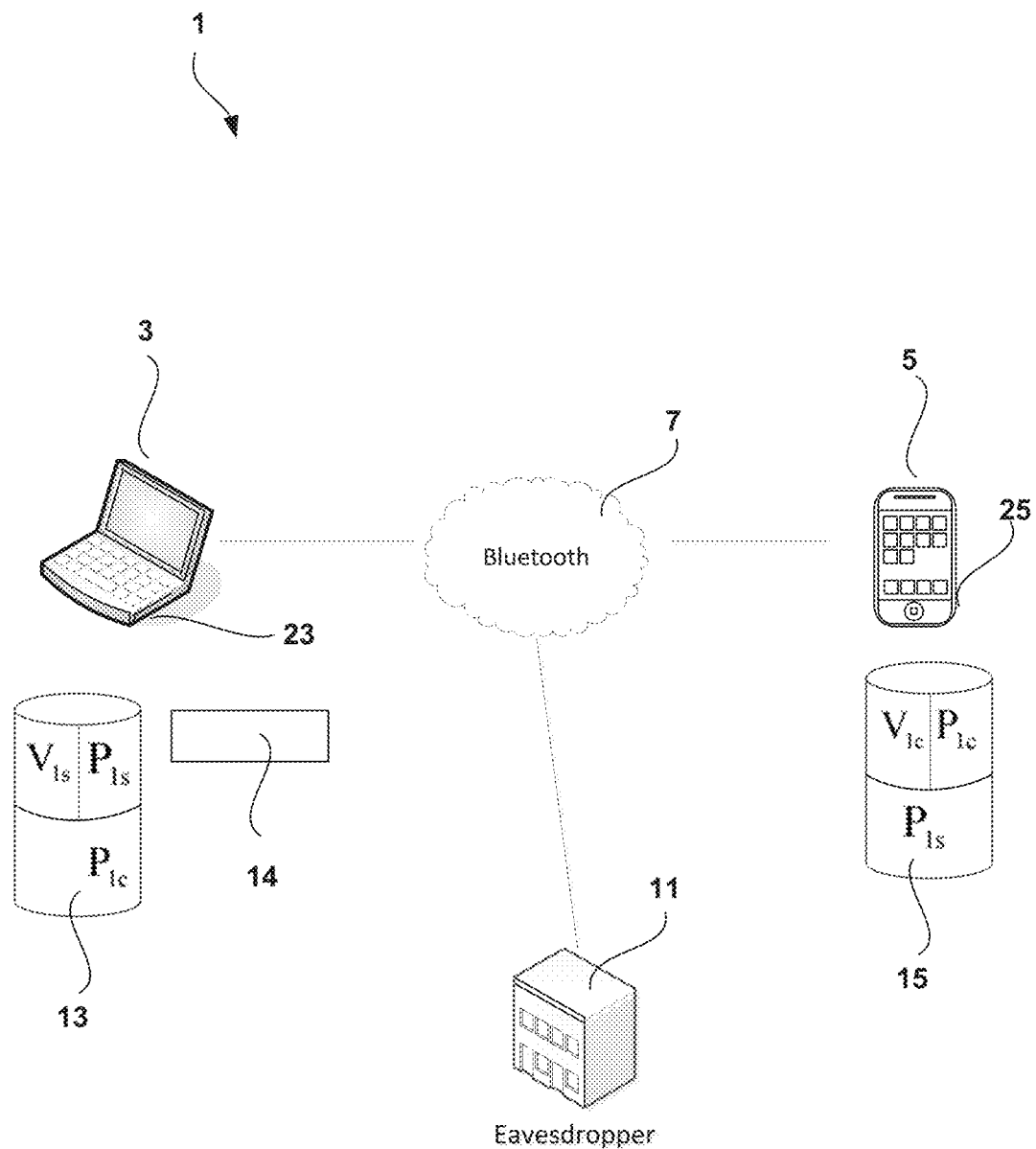
FIG. 1 is a schematic diagram of an example system to encrypt data.

FIG. 1 illustrates a computer system 1 that includes an electronic device 3 that is in communication with a key device 5. The electronic device 3 has an associated first processing device 23 and the key device 5 has an associated second processing device 25. The electronic device 3 may be a personal electronic device, such as a laptop computer, a desk computer, a tablet computer, a mobile communication device, a computer server or any other computing device capable of processing data. In this particular example as illustrated in FIG. 1, the electronic device 3 is represented by a laptop computer.

The key device 7 may be a further personal electronic device, such as a mobile communication device, a portable memory device, such as a USB drive or the like. In this particular example as illustrated in FIG. 1, the key device 5 is represented by a mobile communication device.

The electronic device 3 may be in communication with the key device 5 via a wireless protocol, such as Bluetooth or a communications network, for example the internet or a local communications network. Alternatively, the electronic device 3 may be physically connected to the key device 5, for example via a USB port of the electronic device or via a cable connection. In this particular example as illustrated in FIG. 1, the electronic device 3 is in communication with the key device 5 via Bluetooth 7.

The electronic device 3 is associated with a first asymmetric cryptography pair having an electronic device master private key ($V_{1S}$) and an electronic device master public key ($P_{1S}$). The key device 5 is associated with a second asymmetric cryptography pair having a key device master private key ($V_{1C}$) and a key device master public key ($P_{1C}$). The first and second asymmetric cryptography pairs may be generated during registration. Methods of registration 200, 300 performed by the electronic device 3 and the key device 5 will be described in further detail below with reference to FIG. 2. The public key for each device may be shared between the devices 3, 5 publicly, for example via Bluetooth 7.

To encrypt data at the electronic device 3, a secret is determined based on a technique similar to the technique described in the co-filed application no. GB1603117.1 (Feb. 23, 2016), and GB1619301.3 (filed Nov. 15, 2016), both entitled "Determining a common secret for two Blockchain nodes for the secure exchange of information" filed at the Intellectual Property Office by the applicant, which is herein incorporated by reference in its entirety. The secret is determined on a private cryptography key of the electronic device 3 and a public cryptography key of the key device 5. By determining the secret, data can be encrypted using an encryption key (E) that is based on the determined secret. In some examples, the secret may be used as the encryption key (E). One of the advantages of this technique is that there is no need for transmitting or storing the secret or the encryption key (E) on any of the devices 3, 5.

Figure 3:
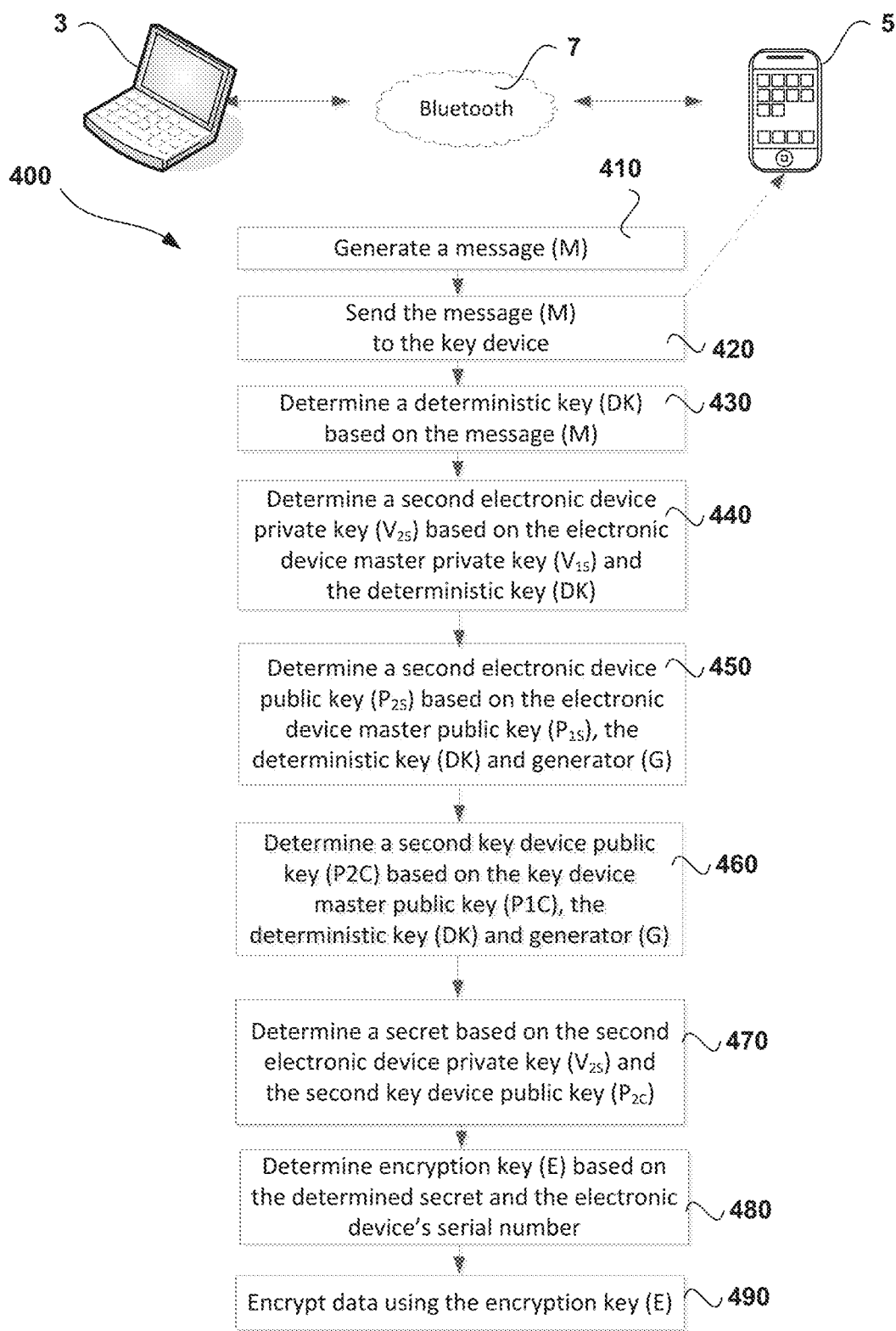
FIG. 3 is a flow chart of a computer-implemented method for encrypting data at the electronic device of FIG. 1 using a secret.

To encrypt the data using the secret at the electronic device 3, the method 400 is performed without communicating any of the private keys between the devices 3, 5 which will be described in further detail with reference to FIG. 3.

In general, the method of encrypting data performed by the electronic device 3 initially includes connecting the electronic device 3 with a key device 5 to communicate with the key device 5. The communication may be established through a wired connection or a wireless connection, such as Bluetooth 7.

The method further includes determining a deterministic key (DK) which may be based on a message (M) created by the electronic device 3. For example, the processing device 23 of the electronic device 3 may generate a message (M) and then uses a standard algorithm to create a hash of the message forming the deterministic key (DK).

The method further includes determining a second electronic device private key ($V_{2S}$) based on at least the electronic device master private key ($V_{1S}$) and the deterministic key (DK), and determining a second key device public key ($P_{2C}$) based on the key device master public key ($P_{1C}$) and the deterministic key (DK). A secret is then determined based on the second electronic device private key ($V_{2S}$) and the second key device public key ($P_{2C}$). Optionally, the method may include determining a second electronic device public key ($P_{2S}$) based on at least the electronic device master public key ($P_{1S}$) and the deterministic key (DK).

In a further method step, data can then be encrypted using an encryption key (E) that is based on the determined secret.

As mentioned above, the determined secret itself may be used as encryption key (E), or the encryption key (E) may be determined based on the secret. Following encrypting the data on the electronic device, the secret may be erased and only the deterministic key (DK) or the message (M) may be sent to the key device 5 where it can be securely stored. The deterministic key (DK) or the message (M) stored on the key device 5 can subsequently be used to decrypt the encrypted data.

It will be appreciated that the data to be encrypted/decrypted may comprise one or more individual files, one or more folders comprising files or an entire hard drive of the electronic device. In some examples, the method may comprise prompting a user to select the files and/or folders that are to be encrypted/decrypted. In such case, the key device 5 may store information indicative of a deterministic key for each file and folder and link them accordingly.

Method of Registration 200, 300

Figure 2:
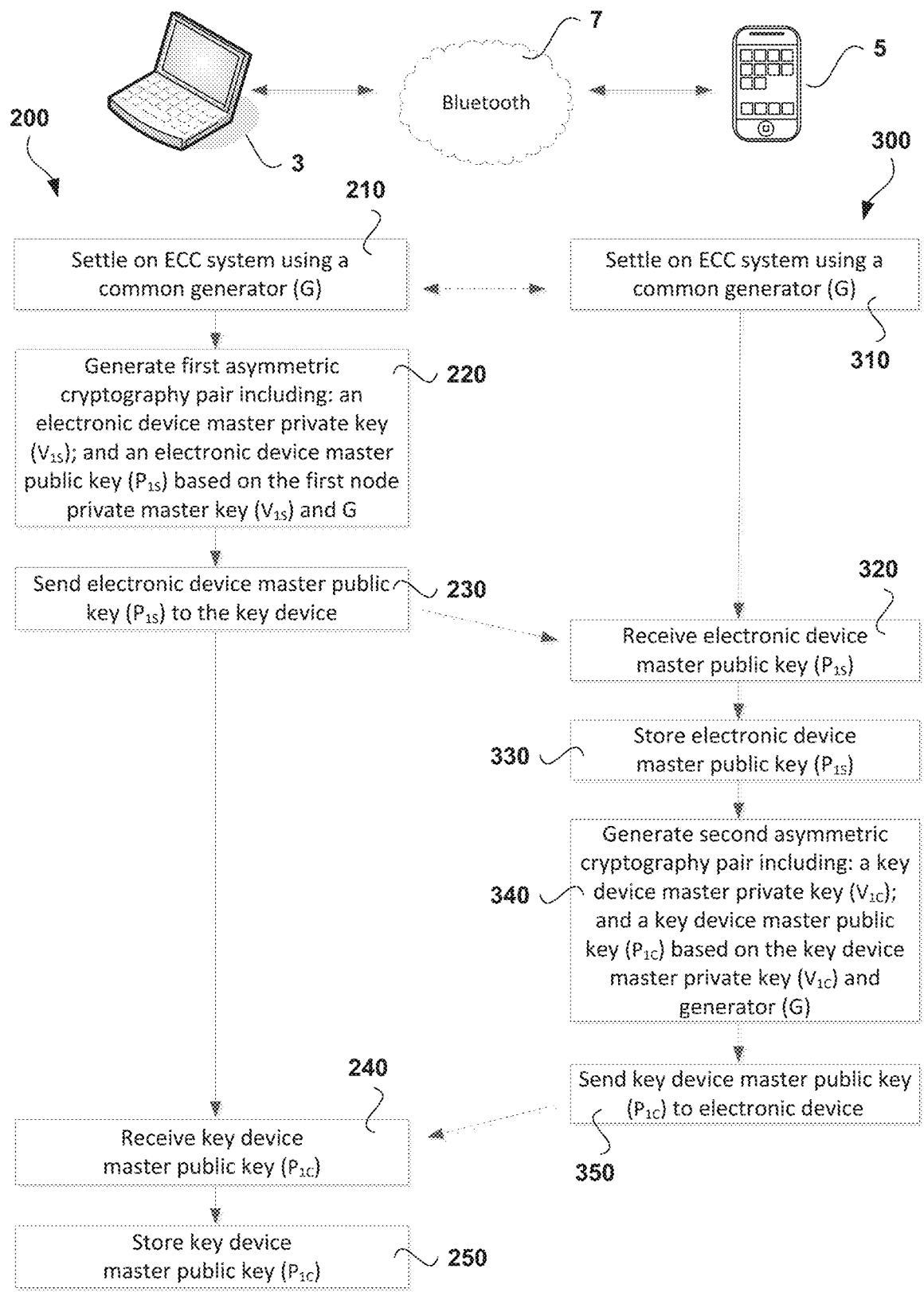
FIG. 2 is a flow chart of computer-implemented methods for registering the electronic device and the key device of FIG. 1.

An example of methods of registration 200, 300 will be described with reference to FIG. 2, where method 200 is performed by the electronic device 3 and method 300 is performed by the key device 5. This includes establishing the first and second asymmetric cryptography pairs for the respective devices 3, 5.

The asymmetric cryptography pairs include associated private and public keys, such as those used in public-key encryption. In this example, the asymmetric cryptography pairs are generated using Elliptic Curve Cryptography (ECC) and properties of elliptic curve operations.

Standards for ECC may include known standards such as those described by the Standards for Efficient Cryptography Group (www.sceg.org). Elliptic curve cryptography is also described in U.S. Pat. Nos. 5,600,725, 5,761,305, 5,889,865, 5,896,455, 5,933,504, 6,122,736, 6,141,420, 6,618,483, 6,704,870, 6,785,813, 6,078,667, 6,792,530.

In the method 200, 300, this includes the electronic device 3 and the key device 5 settling 210, 310 to a common ECC system and using a common generator (G). In one example, the common ECC system may be based on secp256K1 which is an ECC system used by Bitcoin. The common generator (G) may be selected, randomly generated, or assigned.

In the specific example illustrated in FIG. 1 in which the electronic device 3 is a laptop computer and the key device 5 is a mobile communication device, communications between the respective devices 3, 5 are realised by an application programming interface (API) communicating with a dedicated application installed on the mobile communications device 5. For this, software may be downloaded and installed on the laptop computer which is compatible with the dedicated application installed on the mobile communication device.

In a specific example, the key device 5 may be provided with not only the software application for the key device but also with the software for the electronic device. In this way, when the key device is connected to the electronic device, the software can be installed on the electronic device by executing the installation from the key device.

Turning now to the method 200 performed by the electronic device 3, the method 200 includes settling 210 on the common ECC system and common generator (G). This may include sending information indicative of the common ECC system and common generator from the electronic device 3 to the key device 5, or receiving the information from a third device, such as remote server computer. For example, the electronic device 3 may send, via Bluetooth 7, a notice indicative of using the common ECC system with a common generator (G) to the key device 5. In turn, the key device 5 may settle 310 by sending a notice indicative of an acknowledgment to using the common ECC system and common generator (G).

The method 200 also includes generating 220, at the electronic device 3, a first asymmetric cryptography pair that includes the electronic device master private key ($V_{1S}$) and the electronic device master public key ($P_{1S}$). In this particular example, the electronic device master private key ($V_{1S}$) is determined based, at least in part, on a random integer in an allowable range specified in the common ECC system. The electronic device master public key ($P_{1S}$) is then determined based on elliptic curve point multiplication of the electronic device master private key ($P_{1S}$) and the common generator (G) according to the formula:

$$P_{1S} = V_{1S} \times G \qquad \text{(Equation 1)}$$

Thus the first asymmetric cryptography pair includes:

$V_{1S}$: The electronic device master private key that is kept secret by the electronic device.

$P_{1S}$: The electronic device master public key that is made publicly known.

The electronic device 3 may store the first asymmetric cryptography pair in a first data storage 13 associated with the electronic device 3. For security, the electronic device master private key ($V_{1S}$) may be stored in a secure portion of the first data storage 13 to ensure the key remains private.

In this example, the method 200 includes sending 230 the electronic device public master key ($P_{1S}$) to the key device 3. However, for encrypting the data on the electronic device 3, this step may not be necessary.

Turning now to the method 300 performed by the key device 5, in this specific example the key device 5 receives 320 the electronic device master public key ($P_{1S}$) and stores 330 the received electronic device master public key ($P_{1S}$) within a storage element of the key device 5.

Similar to the method 200, the method 300 at the key device 5 includes generating 340 a second asymmetric cryptography pair that includes the key device master private key ($V_{1C}$) and the key device master public key ($P_{1C}$). The key device master private key ($V_{1C}$) is also a random integer within the allowable range specified in the common ECC system. In turn, the key device master public key ($P_{1C}$) is determined by the following formula:

$$P_{1C} = V_{1C} \times G \qquad \text{(Equation 2)}$$

Thus the second asymmetric cryptography pair includes:

$V_{1C}$: The key device master private key that is kept secret by the key device.

$P_{1C}$: The key device master public key that is made publicly known.

The key device 5 may store the second asymmetric cryptography pair in a second data store 15 of the key device. The method 300 further includes sending 330 the key device master public key ($P_{1C}$) to the electronic device 3 where it may be stored in storage 13.

In some alternatives, the respective public master keys may be received and stored at a third data store associate with a third device, such as a trusted third party. This may include a third party that acts as a public directory, such as a certification authority. Thus in some examples, the key device master public key ($P_{1C}$) may be requested and received by the electronic device 3 only when determining the secret is required.

The registration steps may only need to occur once as an initial setup. Afterwards, the master keys can be reused in a secure matter to determine the secret that is dependent, inter alia, on the deterministic key (DK).

Encryption of Data at the Electronic Device 3

An exemplary method 400 of encrypting data at the electronic device 3 by determining a secret that is based on a private key of the electronic device 3 and a public key of the key device 5 will now be described with reference to FIG. 3. The secret may be used for one cycle only, each cycle being a full round of encryption and decryption of the data.

It will be appreciated that new private and public keys may be determined for both the electronic device and the key device for each cycle of encryption and decryption. The new private and public keys may for example be determined by re-hashing the message (M) as described in further detail in the co-filed application as mentioned above which is herein incorporated by reference in its entirety. In this way, sub-keys may be created, wherein each sub-key is linked to the master key.

Generating a Message (M) 410

In this example, the method 400 includes generating 410 a message (M) at the electronic device 3. The message (M) may be random, pseudorandom, or user defined. In one example, the message (M) is based on Unix time and a nonce (and arbitrary value). For example, the message (M) may be provided as:

$$\text{Message}(M) = \text{Unix Time} + \text{nonce} \quad \text{(Equation 3)}$$

In some examples, the message (M) is arbitrary. However it is to be appreciated that the message (M) may have selective values (such as Unix Time, etc.) that may be useful in some applications.

The method 400 includes sending 420 the message (M) via Bluetooth 7, to the key device 5 where the message (M) will be stored. Importantly, the message (M) may be sent to the key device 5 over an unsecure network as the message (M) does not include information on the private keys.

It will be appreciated that the message (M) may be communicated to the key device 5 at any time. For example, the message (M) may be sent to the key device 5 after the encryption of the data is completed.

Determining a Deterministic Key 430

The method 400 further includes the step of determining 430 a deterministic key (DK) based on the message (M). In this example, this includes determining a cryptographic hash of the message. An example of a cryptographic hash algorithm includes SHA-256 to create a 256-bit deterministic key (DK). That is:

$$DK = \text{SHA-256}(M) \quad \text{(Equation 4)}$$

The selection of message may be arbitrary for the purpose of generating the encryption key (E) and will be newly selected for each encryption/decryption cycle. In this example, the message (M) is reduced to 160 bits by hashing in order to keep the message length short.

It is to be appreciated that other hash algorithms may be used. This may include other hash algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may be based on Zémor-Tillich hash function and knapsack-based hash functions.

Determining Second Private and Public Keys 440, 450, 460

The method 400 then includes determining 440, 450, 460 the following second keys based on the deterministic key (DK), i.e. the hash of the message (M).

The second electronic device private key ($V_{2S}$) is determined 440 based on the electronic device master private key ($V_{1S}$) and the hash of the message (M). This can be based on a scalar addition of the electronic device master private key ($V_{1S}$) and the hash of the message (M) according to the following formula:

$$V_{2S} = V_{1S} + \text{SHA-256}(M) \quad \text{(Equation 5)}$$

The second electronic device public key ($P_{2S}$) is determined 450 based on the electronic device master public key ($P_{1S}$) and the hash of the message (M). This can be determined based on the following formula:

$$P_{2S} = P_{1S} + \text{SHA-256}(M) \times G \quad \text{(Equation 6)}$$

The second key device public key ($P_{2C}$) is determined 460 based on the key device master public key ($P_{1C}$) and the hash of the message (M). This can be determined according to the following formula:

$$P_{2C} = P_{1C} + \text{SHA-256}(M) \times G \quad \text{(Equation 7)}$$

It should be noted that in this specific example in which elliptic curve cryptography is applied, 'G' refers to the generator, the operator '+' refers to elliptic curve point addition and the operator '×' refers to elliptic curve point multiplication.

Furthermore, it should be noted that for the encryption of the data, it may not be necessary to determine the second electronic device public key $P_{2S}$. As will be described in further detail below, for determining the secret, the second electronic device public key $P_{2S}$ may not be necessary.

Determine the Secret 470

The electronic device 3 may then determine 470 the secret based on the determined second electronic device private key ($V_{2S}$) and the determined second key device public key ($P_{2C}$). The secret may be determined by the electronic device 3 according to the following formula:

$$CS = V_{2C} \times P_{2S} \quad \text{(Equation 8)}$$

The Secret and Encryption Key

The secret may be used as asymmetric encryption key, or as the basis for determining a symmetric encryption key.

In this particular example, the method 400 includes a further step of determining 480 an encryption key (E) based on the determined secret. The encryption key (E) is further based on the electronic device's serial number to ensure that the encryption key (E) is specific to the electronic device 3. The encryption key (E) is determined according to the following formula:

$$E = \text{SHA256}(\text{SHA256}(\text{salt} + \text{secret}) + \text{serial number}) \quad \text{(Equation 9)}$$

Where salt = message (M)

In this particular example, the concept of random salts is used to determine the encryption key (E). It will be appreciated that any suitable techniques to calculate an encryption key (E) based on the determined secret may be used (if any).

The method 400 further includes encrypting 490 the data, at the electronic device 3, using the determined encryption key (E). It will be appreciated that any suitable method for encrypting the data using the encryption key (E) may be used.

Importantly, the electronic device 3 does not need to store the encryption key (E) or the secret as this can be re-calculated based on the message (M) which is stored on a data storage of the key device 5.

Decryption of the Encrypted Data

Figure 4:
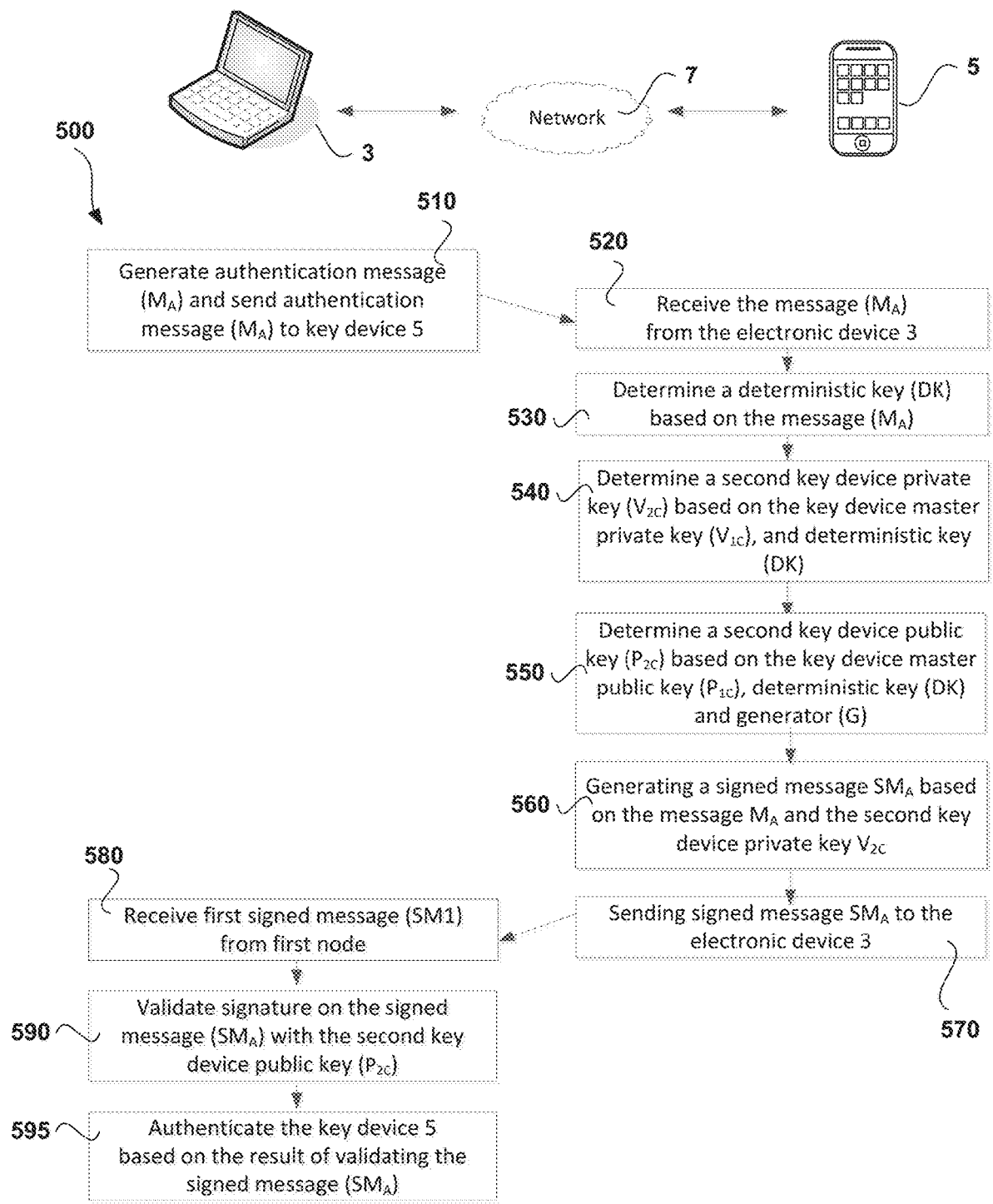
FIG. 4 is a flow chart of a computer-implemented method of authenticating the key device of FIG. 1.
Figure 5:
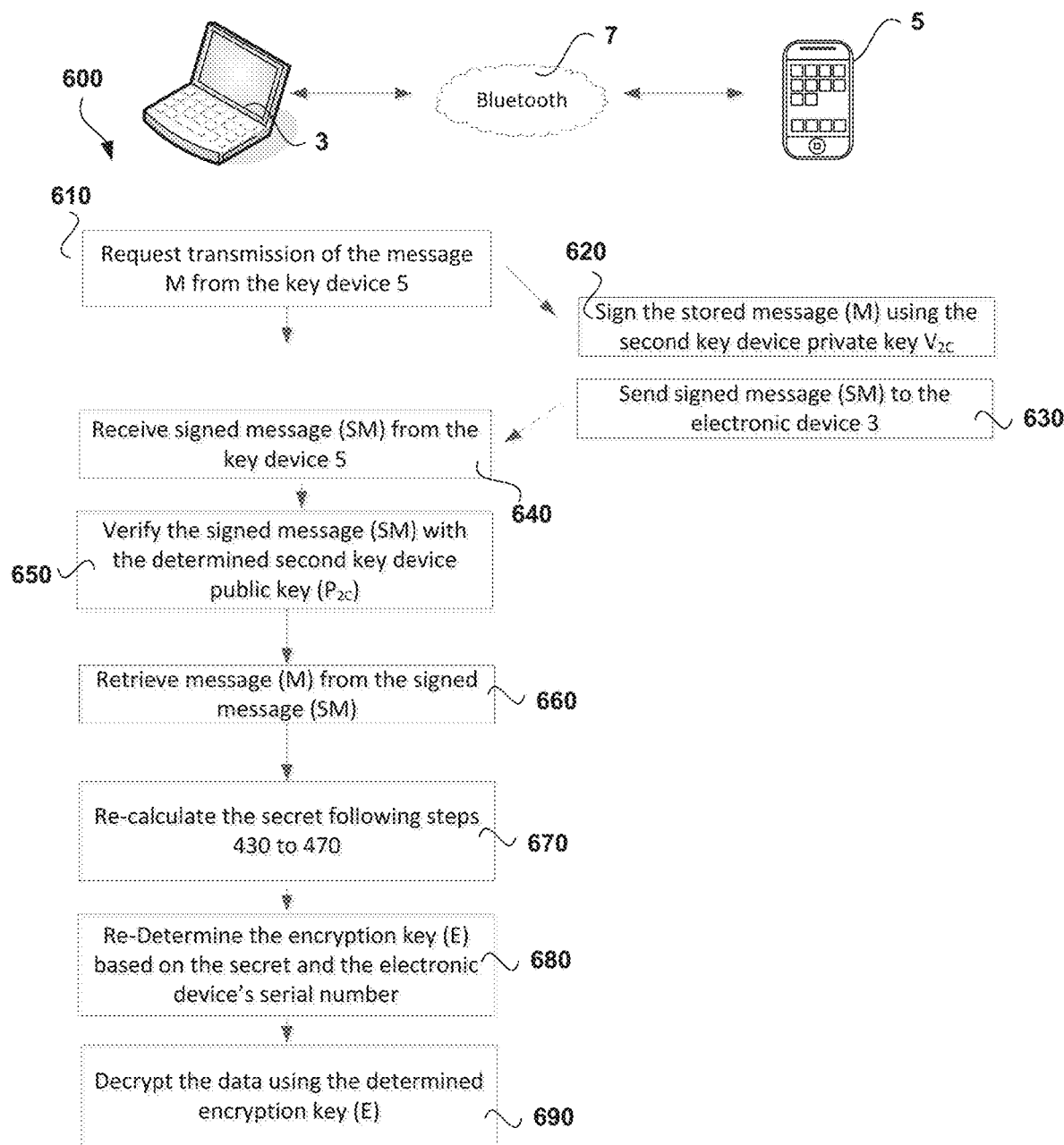
FIG. 5 is a flow chart of a computer implemented method of decrypting the encrypted data at the electronic device following authentication of the key device.

Following the encryption of the data at the electronic device 3, a method of decrypting the encrypted data at the electronic device 3 will now be described with reference to FIGS. 4 and 5. To decrypt the data, the electronic device 3 re-calculates the secret which was previously determined when the data was encrypted.

Initially, the electronic device 3 is connected to the key device 5 to be in communication with each other. The step of connecting the respective devices 3, 5 may include determining whether the respective software running on the devices is compatible and synchronised.

Authenticating 500 the Key Device 5

Before the encrypted data is decrypted at the electronic device 3, in this particular example, the key device 5 is initially authenticated by the electronic device 3.

A method of authenticating 500 the key device 5 will be described with reference to FIG. 4. The method of authenticating 500 the key device 5 may be part of the decryption cycle of the data at the electronic device 3.

The method 500 includes generating 510 an authentication message ($M_A$) at the electronic device 3 which will be used to authenticate that the key device 5 is the key device 5. It will be appreciated that the generated message ($M_A$) may solely be used for the authentication of the key device 5. However, in some examples, the authentication message ($M_A$) may form the message (M) as described with reference to FIG. 3 used in the encryption process for the next encryption-decryption cycle.

The method 500 includes receiving 520 the authentication message ($M_A$) at the key device 5 via Bluetooth 7 from the electronic device 3.

The key device 5 then determines 530 a deterministic authentication key ($DK_A$) based on the message ($M_A$). For example, the deterministic authentication key ($DK_A$) may be the hash of the authentication message similar to step 430 of method 400 and can be determined according to the following formula:

$$DK_A = \text{SHA-256}(M_A) \quad \text{(Equation 10)}$$

The key device 5 then determines anew asymmetric cryptography pair based on the deterministic authentication key ($DK_A$). Specific to this example, the method 500 includes determining 540 a second key device private key $V_{2C}$ according to the following formula:

$$V_{2C} = V_{1C} + \text{SHA-256}(M_A) \quad \text{(Equation 11)}$$

The method 500 also includes determining 550 a second key device public key $P_{2C}$ according to the following formula.

$$P_{2C} = P_{1C} + \text{SHA-256}(M_A) \times G \quad \text{(Equation 12)}$$

The method 300 further includes generating 560 a signed message ($SM_A$) based on the authentication message ($M_A$) and the determined second key device private key ($V_{2C}$). Generating a signed message includes applying a digital signature algorithm to digitally sign the authentication message ($M_A$). In one example, this includes applying the second key device private key ($V_{2C}$) to the message in an Elliptic Curve Digital Signature Algorithm (ECDSA) to obtain the signed message ($SM_A$). The authentication message ($M_A$) may be signed according to the following formula:

$$SM_A = \text{Sig-}V_{2C}<M_A> \quad \text{(Equation 13)}$$

Examples of ECDSA include those based on ECC systems with secp256k1, secp256r1, secp384r1, se3cp521r1.

The signed authentication message ($SM_A$) is subsequently sent 570 to the electronic device 3 for authentication of the key device 5.

The method 500 includes receiving 580 the signed authentication message ($SM_A$) from the key device 5. The electronic device 3 may then validate 590 the signature on the signed authentication message ($SM_A$) with the second key device public key ($P_{2C}$) that was determined at step 550.

Verifying the digital signature may be done in accordance with an Elliptic Curve Digital Signature Algorithm (ECDSA). Importantly, the signed authentication message ($SM_A$) that was signed with the second key device private key ($V_{2C}$) should only be correctly verified with the corresponding second key device public key ($P_{2C}$), since $V_{2C}$ and $P_{2C}$ form a cryptographic pair. Since these keys are deterministic of the key device master private key ($V_{1C}$) and the key device master public key ($P_{1C}$) that were generated at registration of the key device, verifying the signed authentication message ($SM_A$) can be used as a basis of authenticating that an alleged key device 5 sending the signed message ($SM_A$) is the same key device 5 as during registration.

Re-Calculate the Encryption Key (E) to Decrypt the Encrypted Data

Following successful authentication of the key device 5, the electronic device 3 decrypts the encrypted data by re-calculating the secret and thereby the encryption key (E). An exemplary method 600 of decrypting the encrypted data will now be described with reference to FIG. 5.

The method 600 includes requesting 610 the message (M) that was previously used in the encryption cycle and stored on the key device 5 as described in step 420 of method 400.

The method 600 then includes receiving 630 message (M). In this particular example, the message (M) is signed 620 by the key device 5 using the second key device private key ($V_{2C}$) before the message (M) is sent to the electronic device 3. The message (M) may be signed according to the following formula:

$$SM = \text{Sig-}V_{2C}<M> \quad \text{(Equation 14)}$$

The method 600 further includes verifying 650 the signed message (SM). This may be done by independently determining the second key device public key ($P_{2C}$) and then performing applying an Elliptic Curve Digital Signature Algorithm (ECDSA) to SM and $P_{2C}$. The second key device public key may be determined according to the following formula:

$$P_{2C} = P_{1C} + \text{SHA-256}(M) \times G \quad \text{(Equation 15)}$$

The method 600 then includes retrieving 660 the message (M) from the signed message (M) so that the electronic device 3 can re-calculate 670 the secret following steps 430 to 470 as described with reference to FIG. 3.

In a further step 680, the encryption key (E) is re-determined based on the secret and the electronic device's serial number as described with reference to step 480 of method 400. Once the encryption key (E) is determined, the data can be decrypted 690.

It will be appreciated that for decrypting the encrypted data, a method of authentication as described with reference to FIG. 4 may not be necessary for some embodiments.

Processing Device

As noted above, the electronic device 3 and the key device 5 may be personal electronic devices, such as a laptop computer, tablet computer, mobile communication device, computer server etc. The electronic device may include a processing device 23, 25, a data store 13, 15 and a user interface 14.

Figure 6:
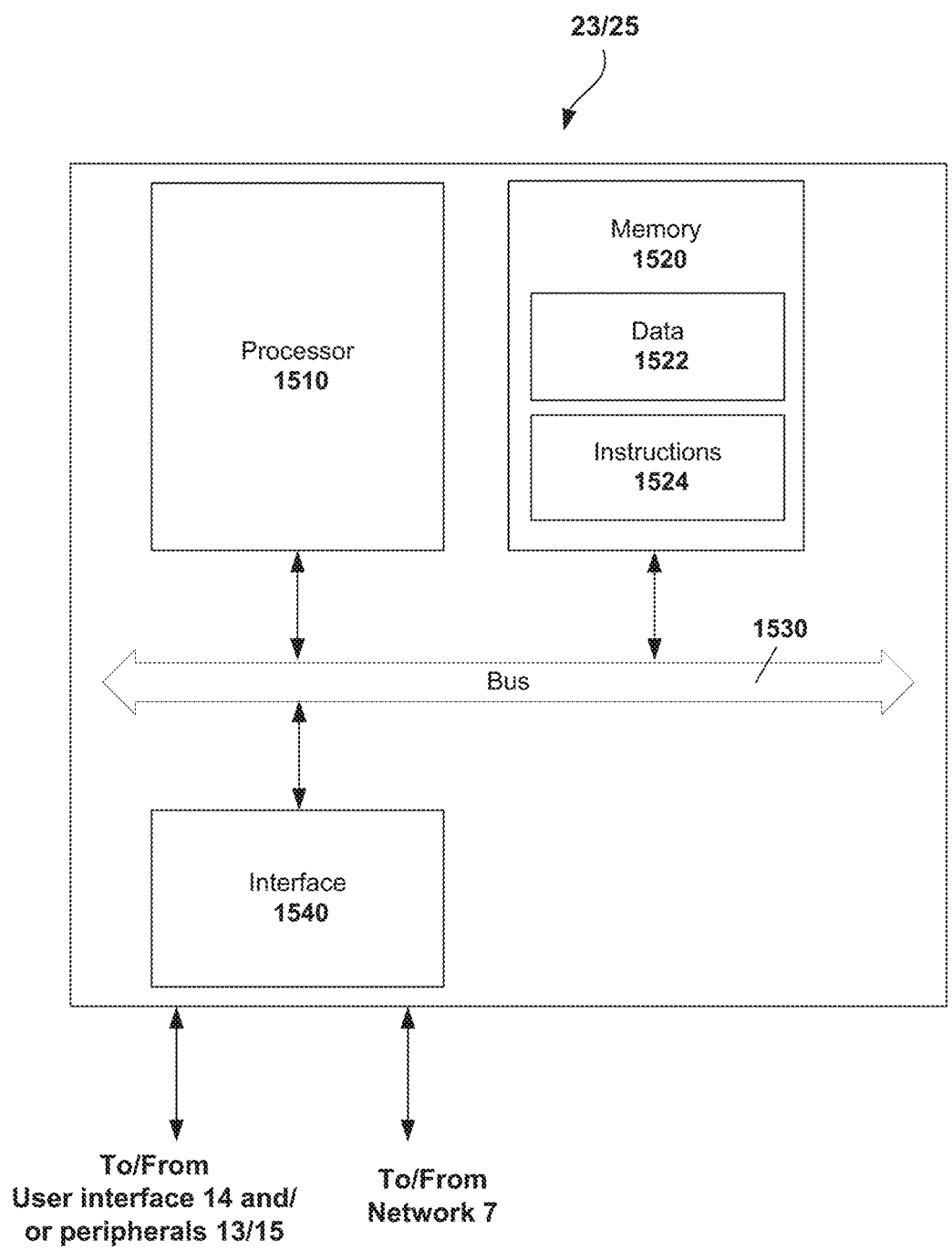
FIG. 6 illustrates a schematic of an example processing device.

FIG. 6 illustrates an example of a processing device 23, 25. The processing device 23, 25 may be used at the electronic device 3, or the key device 5. The processing device 23, 25 includes a processor 1510, a memory 1520 and an interface device 1540 that communicate with each other via a bus 1530. The memory 1520 stores instructions and data for implementing the method 200, 300, 400, 500 and 600 described above, and the processor 1510 performs the instructions from the memory 1520 to implement the method 200, 300, 400, 500 and 600. The interface device 1540, may include a communications module that facilitates communication with the communications network, such as Bluetooth 7 and, in some examples, with the user interface 14 and peripherals such as data store 13, 15. It should be noted that although the processing device 1501 may be independent network elements, the processing device 1501 may also be part of another network element. Further, some functions performed by the processing device 1501 may be distributed between multiple network elements. For example, the electronic device 3 may have multiple processing devices 23 to perform method 200, 400 and parts of method 500, 600 in a secure local area network associated with the electronic device 3.

Where this disclosure describes that a user, issuer, merchant, provider or other entity performs a particular action (including signing, issuing, determining, calculating, sending, receiving, creating etc.), this wording is used for the sake of clarity of presentation. It should be understood that these actions are performed by the computing devices operated by these entities.

Signing may comprise executing a cryptographic function. The function has an input for a clear text and an input for a key, such as a private key. A processor may execute the function to calculate a number or string that can be used as a signature. The signature is then provided together with the clear text to provide a signed text. The signature changes completely if the message text or the key changes by a single bit. While calculating the signature requires little computational power, recreating a message that has a given signature is practically impossible. This way, the clear text can only be changed and accompanied by a valid signature if the private key is available. Further, other entities can easily verify the signature using the publicly available public key.

In most circumstances, encrypting and decrypting comprises a processor executing a cryptographic function to calculate an output string representing the encrypted message or the clear text message respectively.

Keys, tokens, metadata, transactions, offers, contracts, signatures, scripts, metadata, invitations, and the like refer to binary data represented as numbers, text or strings stored on data memory, such as variables in program code of type "string" or "int" or other types or text files.

An example of the peer-to-peer ledger is the bitcoin Blockchain. Transferring funds or paying fees in bitcoin currency comprises creating a transaction on the bitcoin Blockchain with the funds or fees being output from the transaction. An example of a bitcoin transaction includes an input transaction hash, a transaction amount one or more destinations, a public key of a payee or payees and a signature created by using the input transaction as the input message and a private key of a payer to calculate the signature. The transaction can be verified by checking that the input transaction hash exists in a copy of the bitcoin Blockchain and that the signature is correct using the public key. To ensure that the same input transaction hash has not been used elsewhere already, the transaction is broadcast to a network of computing nodes ('miners'). A miner accepts and records the transaction on the Blockchain only if the input transaction hash is not yet connected and the signatures are valid. A miner rejects the transaction if the input transaction hash is already linked to a different transaction.

When two items are associated, this means that there is a logical connection between these items. In a database, for example, identifiers for the two items may be stored in the same records to make the two items associated with each other. In a transaction, identifiers for the two items may be included in the transaction string to make the two items associated with each other.

Authorising another entity may comprise calculating a signature string of a transaction using a private key and providing the signature string to the entity to allow the entity to use the signature to verify the transaction.

A user having an account with another entity may comprise the entity storing information about the user, such as email address, name and potentially public keys. For example, the entity may maintain a database, such as SQL, OrientDB, MongoDB or others. In some examples, the entity may also store one or more of the user's private keys.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A computer implemented method of determining a common secret at an electronic device (S), the electronic device being associated with a key device (C), wherein the electronic device is further associated with a first asymmetric cryptography pair having a first electronic device private key ($V_{1S}$) and a first electronic device public key ($P_{1S}$), and the key device is associated with a second asymmetric cryptography pair having a first key device private key ($V_{1C}$) and a first key device public key ($P_{1C}$), the method comprising:

determining, at the electronic device, a deterministic key (DK);

receiving, at the electronic device, the first key device public key ($P_{1C}$) from the key device;

determining, at the electronic device, a second electronic device private key ($V_{2S}$) based on at least the first electronic device private key ($V_{1S}$) and the deterministic key (DK);

determining, at the electronic device, a second key device public key ($P_{2C}$) based on at least the first key device public key ($P_{1C}$) and the deterministic key (DK);

determining a secret based on at least the second electronic device private key ($V_{2S}$) and the second key device public key ($P_{2C}$);

sending information indicative of the deterministic key (DK) to the key device;

generating, at the electronic device, an authentication message ($M_A$);

sending the authentication message ($M_A$) to the key device;

determining a deterministic authentication key ($DK_A$) by determining a hash of the authentication message ($M_A$);

generating, at the key device, a signed authentication message ($SM_A$) based on the deterministic authentication key ($DK_A$) and a second key device private key ($V_{2C}$);

receiving, at the electronic device, the signed authentication message ($SM_A$) from the key device;
validating the signed message ($SM_A$) with the second key device public key ($P_{2C}$); and authenticating the key device based on the result of validating the signed authentication message ($SM_A$); and
wherein the second key device private key ($V_{2C}$) is based on the deterministic authentication key ($DK_A$) and the first key device private key ($V_{1C}$), and the second key device public key ($P_{2C}$) is based on the deterministic authentication key ($DK_A$) and the first key device public key ($P_{1C}$).

2. The method of claim 1, further comprising:
generating, at the key device, a second asymmetric cryptography pair having the second key device private key (V2C) and the second key device public key ($P_{2C}$).

3. The method of claim 1, further comprising:
encrypting the data at the electronic device using the determined secret or an encryption key that is based on the determined secret.

4. The method of claim 3, further comprising:
receiving, at the electronic device, the information indicative of the deterministic key (DK), from the key device;
determining the secret based on the received information indicative of the deterministic key (DK); and
decrypting, at the electronic device, the encrypted data using the secret or the encryption key that is based on the secret.

5. The method of claim 4, further comprising:
requesting, at the electronic device, the information indicative of the deterministic key (DK) from the key device;
generating, at the key device, a signed message (SM) based on a message (M);
sending the signed message (SM) to the electronic device;
validating, at the electronic device, the signed message (SM); and
retrieving the message (M) such that the secret is to be determined, at the electronic device, for decrypting the data.

6. The method of claim 1 further comprising:
storing, at the key device, the information indicative of the deterministic key (DK).

7. The method of claim 1, wherein:
the deterministic key (DK) is based on a message (M).

8. The method of claim 7, further comprising:
generating the message (M) at the electronic device; and
determining the deterministic key (DK) based on determining a hash of the message (M).

9. The method of claim 1, further comprising:
determining a second electronic device public key ($P_{2S}$) based on at least the first electronic device public key ($P_{1S}$) and the deterministic key (DK).

10. The method of claim 1, further comprising:
sending from the electronic device to the key device, a notice indicative of using a common elliptic curve cryptography (ECC) system with a common generator (G).

11. The method of claim 10, wherein:
the first electronic device public key ($P_{1S}$) and the first key device public key ($P_{1C}$) are based on elliptic curve point multiplication of the respective first electronic device private key ($V_{1S}$) and first key device private key ($V_{1C}$) and the common generator (G).

12. The method of claim 1, further comprising:
generating the first electronic device private key ($V_{1S}$) based on a random integer in an allowable range specified in the common ECC system; and
generating the first electronic device public key ($P_{1S}$) based on elliptic curve point multiplication of the first electronic device private key ($V_{1C}$) and the common generator (G) according to the following formula:

$$P_{1S}=V_{1S}\times G.$$

13. The method of claim 10, further comprising:
generating the second electronic device private key ($V_{2S}$) based on a scalar addition of the first electronic device private key ($V_{1S}$) and the deterministic key (DK) according to the following formula:

$$V_{2S}=V_{1S}+DK.$$

14. The method of claim 10, further comprising:
generating the second electronic device public key ($P_{2S}$) based on at least the first electronic device public key ($P_{1S}$) with elliptic curve point addition to the deterministic key (DK).

15. The method of claim 14, wherein:
the second electronic device public key ($P_{2S}$) is based on the first electronic device public key ($P_{1S}$) with elliptic curve point addition to the elliptic curve point multiplication of the deterministic key (DK) and the common generator (G) according to the following formula:

$$P_{2S}=P_{1S}+DK\times G.$$

16. The method of claim 10, further comprising:
generating the second key device public key ($P_{2C}$) based on at least the first key device public key ($P_{1C}$) with elliptic curve point addition to the deterministic key (DK).

17. The method of claim 16, wherein:
the second key device public key ($P_{2C}$) is based on the first key device public key ($P_{1C}$) with elliptic curve point addition to the elliptic curve point multiplication of the deterministic key (DK) and the common generator (G) according to the following formula:

$$P_{2C}=P_{1C}+DK\times G.$$

18. The method of claim 1, further comprising:
determining the encryption key based on the determined secret and identification information of the electronic device.

19. The method of claim 1, further comprising:
storing, at a data storage associated with the electronic device, the first key device public key ($P_{1C}$).

20. A computer system for determining a common secret at an electronic device, the computer system comprising:
the electronic device being associated with a first asymmetric cryptography pair having a first electronic device private key ($V_{1S}$) and a first electronic device public key ($P_{1S}$),
a key device being associated with a second asymmetric cryptography pair having a first key device private key ($V_{1C}$) and a first key device public key ($P_{1C}$);
wherein the electronic device comprises a processor configured to:
determine a deterministic key (DK);
receive the first key device public key ($P_{1C}$) from the key device;
determine a second electronic device private key ($V_{2S}$) based on at least the first electronic device private key ($V_{1S}$) and the deterministic key (DK);

determine a second key device public key ($P_{2C}$) based on at least the first key device public key ($P_{1C}$) and the deterministic key (DK);

determine a secret based on at least the second electronic device private key ($V_{2S}$) and the second key device public key ($P_{2C}$);

generate, at the electronic device, an authentication message ($M_A$); and send the authentication message ($M_A$) to the key device;

determine a deterministic authentication key ($DK_A$) by determining a hash of the authentication message ($M_A$);

generate, at the key device, a signed authentication message ($SM_A$) based on the deterministic authentication key ($DK_A$) and a second key device private key ($V_{2C}$);

receive, at the electronic device, the signed authentication message ($SM_A$) from the key device;

validate the signed message ($SM_A$) with the second key device public key ($P_{2C}$); and authenticating the key device based on the result of validating the signed authentication message ($SM_A$); and wherein information indicative of the deterministic key (DK) is stored on the key device and wherein the second key device private key ($V_2c$) is based on the deterministic authentication key ($DK_A$) and the first key device private key ($V_{1C}$), and the second key device public key ($P_{2C}$) is based on the deterministic authentication key ($DK_A$) and the first key device public key ($P_{1C}$).

21. The computer system of claim 20, further configured to encrypt the data on the electronic device using the determined secret or an encryption key that is based on the determined secret.

22. The computer system of claim 21, further configured to decrypt data, the processor of the electronic device being configured to:

receive the information indicative of the deterministic key (DK), from the key device;

determine the secret based on the information indicative of the deterministic key (DK); and decrypt the data using the determined secretor the encryption key that is based on the determined secret.

23. An electronic device for determining a common secret, the electronic device being associated with a key device, wherein the electronic device is associated with a first asymmetric cryptography pair having a first electronic device private key ($V_{1S}$) and a first electronic device public key ($P_{1S}$), and the key device is associated with a second asymmetric cryptography pair having a first key device private key ($V_{1C}$) and a first key device public key ($P_{1C}$), the electronic device comprising a processing device configured to:

determine a deterministic key (DK);

receive the first key device public key ($P_{1C}$) from the associated key device;

determine a second electronic device private key ($V_{2S}$) based on at least the first electronic device private key ($V_{1S}$) and the deterministic key (DK);

determine a second key device public key ($P_{2C}$) based on at least the first key device public key ($P_{1C}$) and the deterministic key (DK);

determine a secret based on at least the second electronic device private key ($V_{2S}$) and the second key device public key ($P_{2C}$);

generate, at the electronic device, an authentication message ($M_A$); and send the authentication message ($M_A$) to the key device;

determine a deterministic authentication key ($DK_A$) by determining a hash of the authentication message ($M_A$);

generate, at the key device, a signed authentication message ($SM_A$) based on the deterministic authentication key ($DK_A$) and a second key device private key ($V_{2C}$);

receive, at the electronic device, the signed authentication message ($SM_A$) from the key device;

validate the signed message ($SM_A$) with the second key device public key ($P_{2C}$); and authenticating the key device based on the result of validating the signed authentication message ($SM_A$); and wherein information indicative of the deterministic key (DK) is sent to the key device and wherein the second key device private key ($V_{2C}$) is based on the deterministic authentication key ($DK_A$) and the first key device private key ($V_{1C}$), and the second key device public key ($P_{2C}$) is based on the deterministic authentication key ($DK_A$) and the first key device public key ($P_{1C}$).

24. A non-transitory computer-readable storage medium having a computer program embodied thereon comprising machine-readable instructions to cause a processing device of an electronic device to implement the method of claim 1.

* * * * *